(12) United States Patent
Hayward et al.

(10) Patent No.: US 11,783,422 B1
(45) Date of Patent: Oct. 10, 2023

(54) IMPLEMENTING MACHINE LEARNING FOR LIFE AND HEALTH INSURANCE CLAIMS HANDLING

(71) Applicant: State Farm Mutual Automobile Insurance Company, Bloomington, IL (US)

(72) Inventors: Gregory L Hayward, Bloomington, IL (US); Meghan Sims Goldfarb, Bloomington, IL (US); Nicholas U. Christopulos, Bloomington, IL (US); Erik Donahue, Normal, IL (US)

(73) Assignee: State Farm Mutual Automobile Insurance Company, Bloomington, IL (US)

( * ) Notice: Subject to any disclaimer, the term of this patent is extended or adjusted under 35 U.S.C. 154(b) by 123 days.

(21) Appl. No.: 16/136,387

(22) Filed: Sep. 20, 2018

Related U.S. Application Data

(60) Provisional application No. 62/652,121, filed on Apr. 3, 2018, provisional application No. 62/646,740, filed
(Continued)

(51) Int. Cl.
*G06Q 40/08* (2012.01)
*G06Q 10/10* (2023.01)
(Continued)

(52) U.S. Cl.
CPC .............. *G06Q 40/08* (2013.01); *G06N 3/08* (2013.01); *G06N 20/00* (2019.01); *G06Q 10/10* (2013.01)

(58) Field of Classification Search
None
See application file for complete search history.

(56) References Cited

U.S. PATENT DOCUMENTS 6,281,790 B1   8/2001   Kimmel et al.
7,009,510 B1   3/2006   Douglass et al.
(Continued)

FOREIGN PATENT DOCUMENTS

CA        3006102 A1     6/2017

OTHER PUBLICATIONS

Hua, et al., "A Brief Review of Machine Learning and its Application", 2009, Information Engineering Institute Capital Normal University, entire document pertinent (Year: 2009).
(Continued)

*Primary Examiner* — William J Jacob
(74) *Attorney, Agent, or Firm* — FAEGRE DRINKER BIDDLE & REATH LLP

(57) ABSTRACT

Techniques for implementing machine learning to improve claim handling are disclosed. In some scenarios, the machine-learning, analytics model may be trained in accordance with data that is relevant to insurance products, such as life and health insurance. A set of labeled historical claims each corresponding to a settlement amount may be analyzed to train an artificial neural network. A claim may be received from a user mobile device, and may be analyzed using the trained artificial neural network to predict a claim settlement, which may be used to generate a settlement offer. The settlement offer may be transmitted to the user's mobile device, and if a manifestation of acceptance is received from the user, then the claim may be automatically paid.

20 Claims, 6 Drawing Sheets

Related U.S. Application Data on Mar. 22, 2018, provisional application No. 62/646,735, filed on Mar. 22, 2018, provisional application No. 62/646,729, filed on Mar. 22, 2018, provisional application No. 62/632,884, filed on Feb. 20, 2018, provisional application No. 62/625,140, filed on Feb. 1, 2018, provisional application No. 62/622,542, filed on Jan. 26, 2018, provisional application No. 62/621,797, filed on Jan. 25, 2018, provisional application No. 62/621,218, filed on Jan. 24, 2018, provisional application No. 62/618,192, filed on Jan. 17, 2018, provisional application No. 62/617,851, filed on Jan. 16, 2018, provisional application No. 62/610,599, filed on Dec. 27, 2017, provisional application No. 62/580,713, filed on Nov. 2, 2017, provisional application No. 62/580,655, filed on Nov. 2, 2017, provisional application No. 62/564,055, filed on Sep. 27, 2017.

(51) Int. Cl.
*G06N 3/08* (2023.01)
*G06N 20/00* (2019.01)

(56) References Cited

U.S. PATENT DOCUMENTS

| | | | |
|---|---|---|---|
| 7,149,347 | B1 | 12/2006 | Wnek |
| 7,289,965 | B1 | 10/2007 | Bradley et al. |
| 7,664,662 | B1 * | 2/2010 | Binns |
| 7,711,574 | B1 | 5/2010 | Bradley et al. |
| 7,835,919 | B1 | 11/2010 | Bradley et al. |
| 7,958,066 | B2 | 6/2011 | Pinckney et al. |
| 7,966,203 | B1 | 6/2011 | Pietrzak |
| 7,966,282 | B2 | 6/2011 | Pinckney et al. |
| 8,027,850 | B1 | 9/2011 | Pietrzak |
| 8,145,507 | B2 | 3/2012 | Zizzamia et al. |
| 8,401,878 | B2 | 3/2013 | Stender et al. |
| 8,490,006 | B1 | 7/2013 | Reeser et al. |
| 8,494,152 | B1 | 7/2013 | Roberts et al. |
| 8,504,393 | B2 | 8/2013 | Stewart et al. |
| 8,527,306 | B1 | 9/2013 | Reeser et al. |
| 8,533,144 | B1 | 9/2013 | Reeser et al. |
| 8,595,031 | B1 | 11/2013 | Heffley et al. |
| 8,595,037 | B1 | 11/2013 | Hyde et al. |
| 8,640,038 | B1 | 1/2014 | Reeser et al. |
| 8,665,084 | B2 | 3/2014 | Shapiro et al. |
| 8,890,680 | B2 | 11/2014 | Reeser et al. |
| 8,917,186 | B1 | 12/2014 | Grant |
| 8,930,204 | B1 | 1/2015 | Igoe et al. |
| 8,976,937 | B2 | 3/2015 | Shapiro et al. |
| 9,049,168 | B2 | 6/2015 | Jacob et al. |
| 9,057,746 | B1 | 6/2015 | Houlette et al. |
| 9,082,015 | B2 | 7/2015 | Christopulos et al. |
| 9,117,349 | B2 | 8/2015 | Shapiro et al. |
| 9,142,119 | B1 | 9/2015 | Grant |
| 9,152,737 | B1 | 10/2015 | Micali et al. |
| 9,183,578 | B1 | 11/2015 | Reeser et al. |
| 9,202,363 | B1 | 12/2015 | Grant |
| 9,262,909 | B1 | 2/2016 | Grant |
| 9,286,772 | B2 | 3/2016 | Shapiro et al. |
| 9,344,330 | B2 | 5/2016 | Jacob et al. |
| 9,424,737 | B2 | 8/2016 | Bailey et al. |
| 9,443,195 | B2 | 9/2016 | Micali et al. |
| 9,472,092 | B1 | 10/2016 | Grant |
| 9,536,052 | B2 | 1/2017 | Amarasingham et al. |
| 9,589,441 | B2 | 3/2017 | Shapiro et al. |
| 9,609,003 | B1 | 3/2017 | Chmielewski et al. |
| 9,665,892 | B1 | 5/2017 | Reeser et al. |
| 9,666,060 | B2 | 5/2017 | Reeser et al. |
| 9,684,933 | B2 | 6/2017 | Schumann, Jr. |
| 9,699,529 | B1 | 7/2017 | Petri et al. |
| 9,705,695 | B1 | 7/2017 | Brandman et al. |
| 9,739,813 | B2 | 8/2017 | Houlette et al. |
| 9,786,158 | B2 | 10/2017 | Beaver et al. |
| 9,798,979 | B2 | 10/2017 | Fadell et al. |
| 9,798,993 | B2 | 10/2017 | Payne et al. |
| 9,800,570 | B1 | 10/2017 | Bleisch |
| 9,800,958 | B1 | 10/2017 | Petri et al. |
| 9,812,001 | B1 | 11/2017 | Grant |
| 9,875,509 | B1 | 1/2018 | Harvey et al. |
| 9,888,371 | B1 | 2/2018 | Jacob |
| 9,892,463 | B1 | 2/2018 | Hakimi et al. |
| 9,898,168 | B2 | 2/2018 | Shapiro et al. |
| 9,898,912 | B1 | 2/2018 | Jordan et al. |
| 9,911,042 | B1 | 3/2018 | Cardona et al. |
| 9,923,971 | B2 | 3/2018 | Madey et al. |
| 9,942,630 | B1 | 4/2018 | Petri et al. |
| 9,947,202 | B1 | 4/2018 | Moon et al. |
| 9,978,033 | B1 | 5/2018 | Payne et al. |
| 9,997,056 | B2 | 6/2018 | Bleisch |
| 10,002,295 | B1 | 6/2018 | Cardona et al. |
| 10,042,341 | B1 | 8/2018 | Jacob |
| 10,047,974 | B1 | 8/2018 | Riblet et al. |
| 10,055,793 | B1 | 8/2018 | Call et al. |
| 10,055,803 | B2 | 8/2018 | Orduna et al. |
| 10,057,664 | B1 | 8/2018 | Moon et al. |
| 10,073,929 | B2 | 9/2018 | Vaynriber et al. |
| 10,102,584 | B1 | 10/2018 | Devereaux et al. |
| 10,102,585 | B1 | 10/2018 | Bryant et al. |
| 10,107,708 | B1 | 10/2018 | Schick et al. |
| 10,142,394 | B2 | 11/2018 | Chmielewski et al. |
| 10,158,498 | B2 | 12/2018 | Brandman et al. |
| 10,176,526 | B2 * | 1/2019 | McLaughlin |
| 10,176,705 | B1 | 1/2019 | Grant |
| 10,181,160 | B1 | 1/2019 | Hakimi-Boushehri et al. |
| 10,186,134 | B1 | 1/2019 | Moon et al. |
| 10,198,771 | B1 | 2/2019 | Madigan et al. |
| 10,217,068 | B1 | 2/2019 | Davis et al. |
| 10,229,394 | B1 | 3/2019 | Davis et al. |
| 10,244,294 | B1 | 3/2019 | Moon et al. |
| 10,249,158 | B1 | 4/2019 | Jordan et al. |
| 10,282,787 | B1 | 5/2019 | Hakimi-Boushehri et al. |
| 10,282,788 | B1 | 5/2019 | Jordan et al. |
| 10,282,961 | B1 | 5/2019 | Jordan et al. |
| 10,295,431 | B1 | 5/2019 | Schick et al. |
| 10,297,138 | B2 | 5/2019 | Reeser et al. |
| 10,304,313 | B1 | 5/2019 | Moon et al. |
| 10,323,860 | B1 | 6/2019 | Riblet et al. |
| 10,325,473 | B1 | 6/2019 | Moon et al. |
| 10,332,059 | B2 | 6/2019 | Matsuoka et al. |
| 10,346,811 | B1 | 7/2019 | Jordan et al. |
| 10,353,359 | B1 | 7/2019 | Jordan et al. |
| 10,356,303 | B1 | 7/2019 | Jordan et al. |
| 10,387,966 | B1 | 8/2019 | Shah et al. |
| 10,388,135 | B1 | 8/2019 | Jordan et al. |
| 10,412,169 | B1 | 9/2019 | Madey et al. |
| 10,446,000 | B2 | 10/2019 | Friar et al. |
| 10,467,476 | B1 | 11/2019 | Cardona et al. |
| 10,480,825 | B1 | 11/2019 | Riblet et al. |
| 10,482,746 | B1 | 11/2019 | Moon et al. |
| 10,497,250 | B1 | 12/2019 | Hayward et al. |
| 10,506,411 | B1 | 12/2019 | Jacob |
| 10,514,669 | B1 | 12/2019 | Call et al. |
| 10,515,372 | B1 | 12/2019 | Jordan et al. |
| 10,522,009 | B1 | 12/2019 | Jordan et al. |
| 10,546,478 | B1 | 1/2020 | Moon et al. |
| 10,547,918 | B1 | 1/2020 | Moon et al. |
| 10,565,541 | B2 | 2/2020 | Payne et al. |
| 10,572,947 | B1 | 2/2020 | Berends et al. |
| 10,573,146 | B1 | 2/2020 | Jordan et al. |
| 10,573,149 | B1 | 2/2020 | Jordan et al. |
| 10,579,028 | B1 | 3/2020 | Jacob |
| 10,586,177 | B1 | 3/2020 | Choueiter et al. |
| 10,607,295 | B1 | 3/2020 | Hakimi-Boushehri et al. |
| 10,634,576 | B1 | 4/2020 | Schick et al. |
| 10,679,292 | B1 | 6/2020 | Call et al. |
| 10,685,402 | B1 | 6/2020 | Bryant et al. |
| 10,726,494 | B1 | 7/2020 | Shah et al. |
| 10,726,500 | B1 | 7/2020 | Shah et al. |
| 10,733,671 | B1 | 8/2020 | Hakimi-Boushehri et al. |
| 10,733,868 | B2 | 8/2020 | Moon et al. |
| 10,735,829 | B2 | 8/2020 | Petri et al. |

(56) References Cited

U.S. PATENT DOCUMENTS

| | | |
|---|---|---|
| 10,740,691 B2 | 8/2020 | Choueiter et al. |
| 10,741,033 B1 | 8/2020 | Jordan et al. |
| 10,750,252 B2 | 8/2020 | Petri et al. |
| 10,755,357 B1 | 8/2020 | Davis et al. |
| 10,795,329 B1 | 10/2020 | Jordan et al. |
| 10,796,557 B2 | 10/2020 | Sundermeyer et al. |
| 10,823,458 B1 | 11/2020 | Riblet et al. |
| 10,824,971 B1 | 11/2020 | Davis et al. |
| 10,825,320 B1 | 11/2020 | Moon et al. |
| 10,825,321 B2 | 11/2020 | Moon et al. |
| 10,832,225 B1 | 11/2020 | Davis et al. |
| 10,846,800 B1 | 11/2020 | Bryant et al. |
| 10,891,694 B1 | 1/2021 | Leise et al. |
| 10,922,756 B1 | 2/2021 | Call et al. |
| 10,922,948 B1 | 2/2021 | Moon et al. |
| 10,943,447 B1 | 3/2021 | Jordan et al. |
| 10,970,990 B1 | 4/2021 | Jacob |
| 10,990,069 B1 | 4/2021 | Jacob |
| 11,003,334 B1 | 5/2021 | Conway et al. |
| 11,004,320 B1 | 5/2021 | Jordan et al. |
| 11,015,997 B1 | 5/2021 | Schick et al. |
| 11,017,480 B2 | 5/2021 | Shah et al. |
| 11,042,137 B1 | 6/2021 | Call et al. |
| 11,042,942 B1 | 6/2021 | Hakimi-Boushehri et al. |
| 11,043,098 B1 | 6/2021 | Jordan et al. |
| 11,049,078 B1 | 6/2021 | Jordan et al. |
| 11,049,189 B2 | 6/2021 | Shah et al. |
| 11,074,659 B1 | 7/2021 | Hakimi-Boushehri et al. |
| 11,118,812 B1 | 9/2021 | Riblet et al. |
| 11,126,708 B2 | 9/2021 | Reimer |
| 11,127,082 B1 | 9/2021 | Gore et al. |
| 2003/0032871 A1 | 2/2003 | Selker et al. |
| 2005/0096944 A1 | 5/2005 | Ryan |
| 2006/0136273 A1 | 6/2006 | Zizzamia et al. |
| 2006/0242046 A1* | 10/2006 | Haggerty |
| 2006/0277077 A1 | 12/2006 | Coleman, Jr. |
| 2006/0293926 A1 | 12/2006 | Khury |
| 2008/0147441 A1 | 6/2008 | Kil |
| 2009/0265193 A1 | 10/2009 | Collins et al. |
| 2010/0131304 A1 | 5/2010 | Collopy et al. |
| 2010/0324943 A1* | 12/2010 | Klibanow |
| 2011/0054925 A1* | 3/2011 | Ghani |
| 2011/0161119 A1 | 6/2011 | Collins |
| 2011/0213731 A1 | 9/2011 | Cho et al. |
| 2011/0295624 A1 | 12/2011 | Chapin et al. |
| 2013/0262029 A1 | 10/2013 | Pershing |
| 2014/0052474 A1 | 2/2014 | Madan et al. |
| 2014/0122133 A1 | 5/2014 | Weisberg et al. |
| 2014/0156315 A1* | 6/2014 | Canovi |
| 2014/0201126 A1 | 7/2014 | Zadeh et al. |
| 2014/0257862 A1 | 9/2014 | Billman et al. |
| 2014/0266669 A1 | 9/2014 | Fadell et al. |
| 2014/0278561 A1 | 9/2014 | Knuffke |
| 2015/0025914 A1 | 1/2015 | Lekas |
| 2015/0039352 A1 | 2/2015 | Rempp |
| 2015/0073835 A1 | 3/2015 | Sivagnanam |
| 2015/0088556 A1 | 3/2015 | Convery et al. |
| 2015/0216413 A1 | 8/2015 | Soyao et al. |
| 2015/0235321 A1 | 8/2015 | Unser et al. |
| 2015/0235322 A1 | 8/2015 | Emison |
| 2015/0302529 A1 | 10/2015 | Jagannathan |
| 2016/0055589 A1* | 2/2016 | Billings |
| 2016/0117778 A1 | 4/2016 | Costello et al. |
| 2016/0267396 A1* | 9/2016 | Gray |
| 2017/0011313 A1 | 1/2017 | Pochert et al. |
| 2017/0091871 A1 | 3/2017 | Trainor et al. |
| 2017/0147777 A1 | 5/2017 | Kim et al. |
| 2017/0154382 A1* | 6/2017 | McLaughlin |
| 2017/0161758 A1 | 6/2017 | Towriss |
| 2017/0185723 A1* | 6/2017 | McCallum |
| 2017/0186120 A1 | 6/2017 | Reid |
| 2017/0221152 A1 | 8/2017 | Nelson et al. |
| 2017/0286622 A1 | 10/2017 | Cox et al. |
| 2017/0293894 A1* | 10/2017 | Taliwal |
| 2017/0310498 A1 | 10/2017 | Brandman et al. |
| 2018/0089763 A1 | 3/2018 | Okazaki |
| 2018/0107734 A1 | 4/2018 | Galia et al. |
| 2018/0197249 A1 | 7/2018 | Lehman et al. |
| 2018/0300576 A1 | 10/2018 | Dalyac et al. |
| 2019/0066221 A1 | 2/2019 | Ashly et al. |
| 2020/0143212 A1 | 5/2020 | Okazaki |
| 2020/0204389 A1 | 6/2020 | Brandman et al. |
| 2020/0302549 A1 | 9/2020 | Jordan et al. |
| 2020/0327791 A1 | 10/2020 | Moon et al. |
| 2021/0035432 A1 | 2/2021 | Moon et al. |
| 2021/0042843 A1 | 2/2021 | Bryant et al. |
| 2021/0158671 A1 | 5/2021 | Jordan et al. |
| 2021/0326992 A1 | 10/2021 | Leise et al. |
| 2023/0080371 A1 | 3/2023 | Leise et al. |
| 2023/0082808 A1 | 3/2023 | Okazaki |

OTHER PUBLICATIONS

Treleaven, et al., Computational Finance, published in IEEE Computer (vol. 43, Issue: 12, Dec. 2010), entire document pertinent (Year: 2010).

* cited by examiner

IMPLEMENTING MACHINE LEARNING FOR LIFE AND HEALTH INSURANCE CLAIMS HANDLING

CROSS-REFERENCE TO RELATED APPLICATIONS

This application claims priority to and the benefit of:

U.S. Application No. 62/564,055, filed Sep. 27, 2017 and entitled "REAL PROPERTY MONITORING SYSTEMS AND METHODS FOR DETECTING DAMAGE AND OTHER CONDITIONS;"

U.S. Application No. 62/580,655, filed Nov. 2, 2017 and entitled REAL PROPERTY MONITORING SYSTEMS AND METHODS FOR DETECTING DAMAGE AND OTHER CONDITIONS;"

U.S. Application No. 62/610,599, filed Dec. 27, 2017 and entitled "AUTOMOBILE MONITORING SYSTEMS AND METHODS FOR DETECTING DAMAGE AND OTHER CONDITIONS;"

U.S. Application No. 62/621,218, filed Jan. 24, 2018 and entitled "AUTOMOBILE MONITORING SYSTEMS AND METHODS FOR LOSS MITIGATION AND CLAIMS HANDLING;"

U.S. Application No. 62/621,797, filed Jan. 25, 2018 and entitled "AUTOMOBILE MONITORING SYSTEMS AND METHODS FOR LOSS RESERVING AND FINANCIAL REPORTING;"

U.S. Application No. 62/580,713, filed Nov. 2, 2017 and entitled "REAL PROPERTY MONITORING SYSTEMS AND METHODS FOR DETECTING DAMAGE AND OTHER CONDITIONS;"

U.S. Application No. 62/618,192, filed Jan. 17, 2018 and entitled "REAL PROPERTY MONITORING SYSTEMS AND METHODS FOR DETECTING DAMAGE AND OTHER CONDITIONS;"

U.S. Application No. 62/625,140, filed Feb. 1, 2018 and entitled "SYSTEMS AND METHODS FOR ESTABLISHING LOSS RESERVES FOR BUILDING/REAL PROPERTY INSURANCE;"

U.S. Application No. 62/646,729, filed Mar. 22, 2018 and entitled "REAL PROPERTY MONITORING SYSTEMS AND METHODS FOR LOSS MITIGATION AND CLAIMS HANDLING;"

U.S. Application No. 62/646,735, filed Mar. 22, 2018 and entitled "REAL PROPERTY MONITORING SYSTEMS AND METHODS FOR RISK DETERMINATION;"

U.S. Application No. 62/646,740, filed Mar. 22, 2018 and entitled "SYSTEMS AND METHODS FOR ESTABLISHING LOSS RESERVES FOR BUILDING/REAL PROPERTY INSURANCE;"

U.S. Application No. 62/617,851, filed Jan. 16, 2018 and entitled "IMPLEMENTING MACHINE LEARNING FOR LIFE AND HEALTH INSURANCE PRICING AND UNDERWRITING;"

U.S. Application No. 62/622,542, filed Jan. 26, 2018 and entitled "IMPLEMENTING MACHINE LEARNING FOR LIFE AND HEALTH INSURANCE LOSS MITIGATION AND CLAIMS HANDLING;"

U.S. Application No. 62/632,884, filed Feb. 20, 2018 and entitled "IMPLEMENTING MACHINE LEARNING FOR LIFE AND HEALTH INSURANCE LOSS RESERVING AND FINANCIAL REPORTING;"

U.S. Application No. 62/652,121, filed Apr. 3, 2018 and entitled "IMPLEMENTING MACHINE LEARNING FOR LIFE AND HEALTH INSURANCE CLAIMS HANDLING;"

the entire disclosures of which are hereby incorporated by reference herein in their entireties.

FIELD OF INVENTION

This disclosure generally relates to implementing machine learning to automate aspects of life, worker's compensation, disability, and/or health insurance claims processing and, more particularly, to improve upon the customer claims handling experience by processing claims using machine learning techniques.

BACKGROUND

Historically, a claim relating to a life, worker's compensation, disability, and/or health insurance policy may be reported to an issuer of the insurance policy (e.g., an insurance company) upon the occurrence of an event covered under the policy. The claim may be allocated to a claims examiner who may manage the claim. For example, the claims examiner may manually update paper and/or electronic files related to the reported, or filed, claim as claim information is provided by the claimant, and/or collected by the insurer. The claims examiner may conduct an investigation and may contact the policy holder/claimant and/or others (e.g., beneficiaries, witnesses, government employees, third parties, etc.).

In many instances, the claim handling process may include time-consuming and fact-intensive processes and procedures. However, insurers are motivated to timely investigate and pay claims promptly. At the same time, insurers are also motivated to identify fraudulent claims or buildup, so as to not penalize all customers with higher rates.

BRIEF SUMMARY

The present disclosure generally relates to methods and systems for implementing machine learning to improve upon aspects of life, worker's compensation, disability, and/or health insurance claim processing and handling throughout the claims lifecycle. In some embodiments, neural networks may be used. Other machine learning techniques, including those discussed elsewhere herein may also be employed. Embodiments of exemplary systems and computer-implemented methods are described below.

In one aspect, a computer-implemented method of automated claims handling may include (1) receiving a set of labeled historical claims (including life, worker's compensation, disability, and/or health claims), each one corresponding to a respective adjusted settlement amount. The method may include (2) training an artificial neural network using a subset of the labeled historical claims and/or each respective adjusted settlement amount. The method may then include (3) receiving a life, worker's compensation, disability, and/or health claim from a user, such as from their mobile device; (4) analyzing the life, worker's compensation, disability, and/or health claim using the trained artificial neural network to determine a claim settlement prediction; and (5) generating, based upon the settlement prediction, a settlement offer. The method may also include (6) transmitting the settlement offer to an application in a user mobile or other device, such as via wireless communication or data transmission. The method may include additional, less, or alternate actions.

In another aspect, a claim handling system may include one or more processors and one or more memories storing instructions. When the instructions are executed by the one or more processors, they may cause the claim handling system to (1) receive a set of life or health claim information from the user; (2) predict a claim settlement amount by analyzing the set of life or health claim information using a trained artificial network; (3) generate a settlement offer based upon the claim settlement amount; (4) display the settlement offer in the user device; and/or (5) receive a manifestation of acceptance from the user device. The system may include additional, less, or alternate functionality, including that discussed elsewhere herein.

Advantages will become more apparent to those skilled in the art from the following description of the preferred embodiments which have been shown and described by way of illustration. As will be realized, the present embodiments may be capable of other and different embodiments, and their details are capable of modification in various respects. Accordingly, the drawings and description are to be regarded as illustrative in nature and not as restrictive.

BRIEF DESCRIPTION OF THE DRAWINGS

The figures described below depict various aspects of the system and methods disclosed therein. It should be understood that each figure depicts one embodiment of a particular aspect of the disclosed system and methods, and that each of the figures is intended to accord with a possible embodiment thereof. Further, wherever possible, the following description refers to the reference numerals included in the following figures, in which features depicted in multiple figures are designated with consistent reference numerals. The figures shown are simplified for expository purposes, and the present embodiments are not limited to the precise arrangements and instrumentalities shown and discussed.

Figure 1:
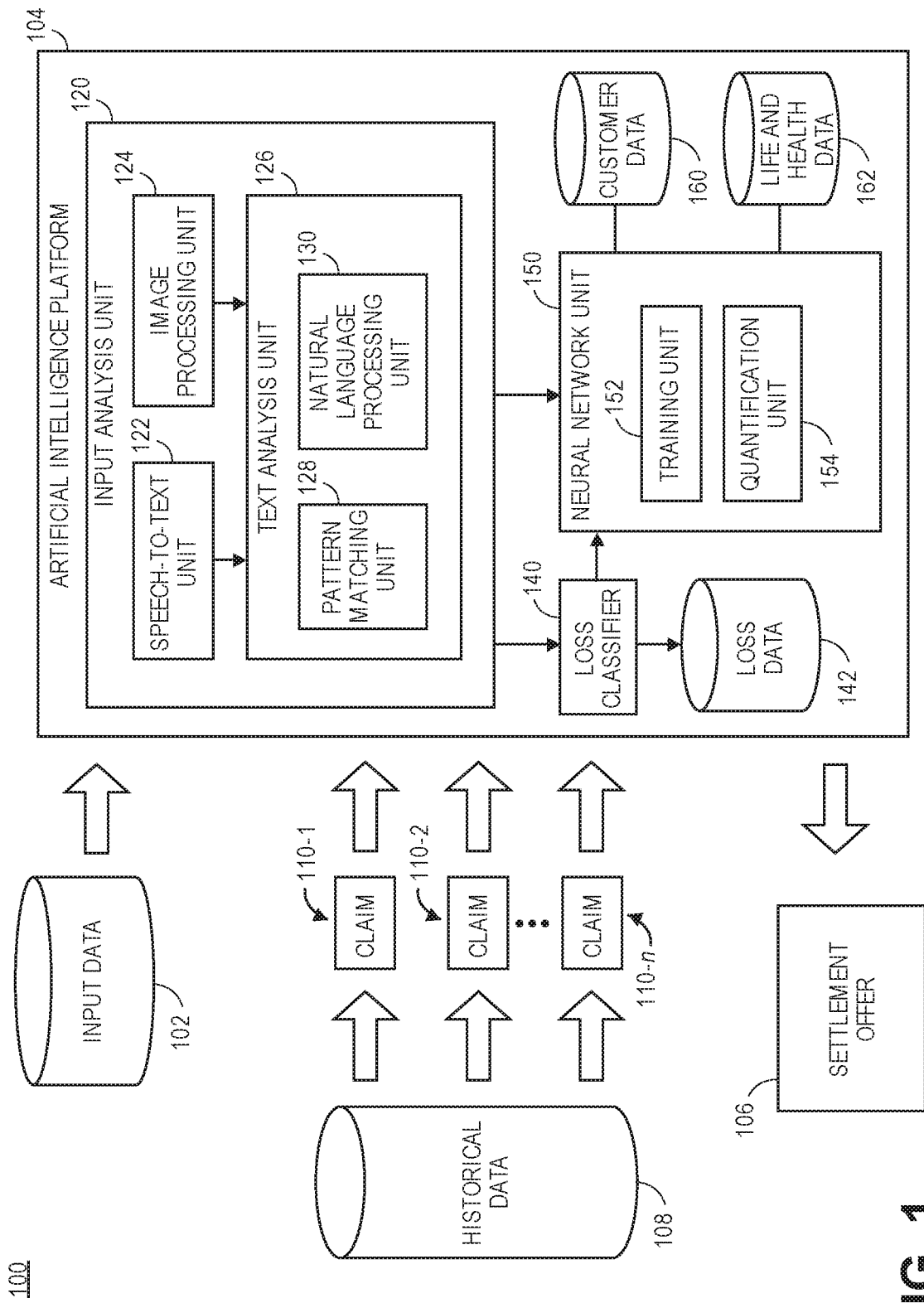
FIG. 1 depicts an exemplary computing environment implementing machine learning to improve upon aspects of life and health insurance claim handling.

The figures depict preferred embodiments for purposes of illustration only. One skilled in the art will readily recognize from the following discussion that alternative embodiments of the systems and methods illustrated herein may be employed without departing from the principles of the invention described herein.

DETAILED DESCRIPTION

Artificial Intelligence System for Life Claims Processing

The present embodiments are directed to, inter alia, training and operating a machine learning model to analyze historical life insurance and/or health insurance claims to, in turn, handle life insurance and/or health insurance claims. Herein a "life claim" may relate to a life, worker's compensation, and/or disability insurance claim. Each life claim may relate to one or more insurance policies. Systems and methods may include natural language processing of free-form notes/text, and/or free-form speech/audio, recorded by a call center and/or a claim adjustor. Photographic evidence and/or other evidence may be used. All suitable input may be received from a customer speaking into a mobile device app that records the customer's speech, and/or into a chat bot or robo-advisor. Handling of a claim may include settling a claim in full and/or in part, flagging the claim for human review, requesting additional information, etc.

The methods and systems may analyze data harvested from subsets of historical claims to train and validate machine learning (ML) models, and to analyze filed claims by executing the trained and validated models providing aspects of the filed claims as input to the trained ML models. The methods and systems may access electronic data and may group and/or classify claim submissions by claim type prior to analysis by one or more trained ML model. For instance, the methods and systems may categorize a claim submission as a life and/or health insurance policy. The electronic data may include information about the insured including, without limitation: electronic medical records, demographic information, insurance records, lifestyle information, psychographic information, etc. For example, the trained ML and/or artificial neural network model may accept as input the insured's age, medical history including electronic medical records, location, etc. Information pertaining to an accident and/or event may be input into and analyzed by the trained ML model. The methods and systems may collect electronic data to construct a dynamic data set, which may change over time as additional information is collected and/or as additional users contribute to an overall data pool that includes a plurality of electronically accessible data each relating to a customer's claims.

The methods and systems may use the dynamic data set to train one or more machine-learning analytics models in an incremental or "online" fashion, so that a model need not be entirely retrained from scratch when new information is received (e.g., when a claimant submits supplemental documentation). Retraining may be skipped in some cases, such as when a pre-set level of model accuracy has already been attained. For example, when a new claim is received from a claimant or third party, the methods and systems may check model accuracy, and if the accuracy is above 99.9%, or another appropriate threshold, the additional training may be avoided.

Generally, the methods and systems may analyze electronic claim data in accordance with the one or more trained machine-learning analytics models to automatically process insurance claims, wherein processing the claim may include any actions suitable to the particular claim type. Traditionally, such actions may have been historically performed manually by an insurance claims intake processor and/or adjustor. For example, a claim may be categorized by type and funneled to a particular group, unit, and/or department of claim adjustors focusing on a particular claim type (e.g., "life insurance, "health insurance," "casualty," etc.).

The present methods and systems may include means for automatically assigning the claim to one or more of the adjustors within a department, wherein the assignment may be based upon an analysis of the claim to determine its category, severity and/or amount of time estimated to complete one or more stages of processing the claim. The assignment of the claim to a department or adjustor may be allocated according to the seniority, experience level, and/or existing backlog of the claims adjuster. It should be appreciated that in one embodiment, the classification step may be omitted, for example, wherein another component validates or forces a categorization.

After the claim is classified, the trained ML model may analyze the claim to determine a number of details. For example, in the life insurance example, the ML model or another component may attempt to extract a death certificate submitted with the claim. The ML model may further attempt to validate the death certificate via internal validation (e.g., by reference to a database or validation mechanism owned by the corporation and/or an independently-trained machine-learning model) or external validation (e.g., a government-operated API or a privately-operated API). The validation methods may determine a provisional or final authenticity and/or validity of the death certificate, which may be a necessary precondition to additional processing of the claim (e.g., before the insurer pays a life insurance claim). A specific model may be trained for validation tasks, and an authenticity output of a trained ML model may be a boolean value (e.g., TRUE or FALSE) or a scaled value (e.g., a percentage) representing a probability or likelihood that the death certificate is authentic. In some cases, a confirmation number or hash value may be stored in association with a validation result obtained via an external database.

The validation steps for health insurance claims may differ from those for life insurance, and may be based upon an entirely different set of analyses, different training, and/or an alternate and/or additional trained model. For example, a validation system and method relating to health insurance may include associating a doctor, hospital, clinic, or other patient visit to a particular claim. This association may be performed by an ML model determining patient visit information, such as a date of service, type of service, description of procedure, dollar amount, etc.

In one embodiment, a ML model may be trained that analyzes a claim and, based upon information related to the patient or a subset of similar patients, determines whether a claim is payable without human review based upon similar patients and/or past treatment of the patient. Similar patients may be identified by training a ML model using patient information corresponding to patients in a similar geographic region (e.g., in a city or region of a state). Similar patients may be identified by identifying a cost-of-living index or geospatial search.

For example, a patient may have hand surgery performed in Bloomington, Ill. at a particular hospital, by a particular surgeon. The surgery may last for one half hour, cost $10,000, and the description of the surgery may include the term "carpal tunnel." Each of the foregoing facts (i.e., the type of surgery, locus within the body, location of the patient, hospital name, surgeon identity, cost, duration, description, etc.) and more may be used to train ML models using a database of hand surgery claims as training data, wherein those facts from each respective hand surgery claims are analyzed in training. Using these inputs, an ML model may be trained to predict whether a given claim for a hand surgery should be paid or not, and if so, a settlement amount or amounts.

Health insurance claims may be determined to be not immediately payable and in need of further review due to a number of factors, some of which may not be immediately apparent based upon a predictive output of a trained ML model. For example, the duration of the surgery may be longer than normal. The cost reported by the medical facility may be aberrantly high, or aberrantly low. The person listed as having performed a surgery (e.g., a hand surgery) may have left the practice of medicine, may have been suspended from practice and/or had her license revoked, may not be board-certified, and/or may not be engaged in orthopedic practice. Such information pertaining to the qualifications of physicians may be discoverable by reference to third-party data sources. Although the presence of one or more factors may cause a payable or non-payable outcome to be produced by the trained ML model, the factors may or may not be particularly identified. In one embodiment, the trained ML model may merely output an indication that the claim is payable or non-payable, and that human review is necessary.

It should be appreciated that the ML model may have an unlimited number of inputs, and that some inputs may include procedural information related to claim processing, such as whether a patient has submitted a signed informed consent form, or the length of time elapsed between the carrying out of a medical procedure and the submission of a claim for the procedure. Other factors may be common to all ML models. For example, a single ML model may determine whether a request for benefits contains an ink signature. To the extent that a claim requires a request for benefits, the ML model may "short-circuit" the claim handling process by requiring that the request for benefits carry the ink signature of the claimant(s) before the claim may be paid and/or analyzed further for settlement purposes. One of the benefits of the computerized methods and systems disclosed herein is that, during normal operation, they may create a time-stamped paper trail that may be used by the insurer to rebut any allegation on the part of the claimant that the insurer has unduly delayed the handling of the claim. The methods and systems may also be more reliable than any relying on human review.

An artificial intelligence platform including an ML model and/or artificial neural network may react based upon certain inputs. For example, some life insurance policies may include contestability clauses, which allow the insurance company to contest payment under a policy under certain circumstances. For example, if a policy holder's cause of death is listed as a suicide, and the effective date of the policy is less than two years from the present time, then the methods and systems herein may automatically cause the policy to be considered non-payable pending further investigation.

In another example, a cause of death of homicide may require further scrutiny and/or investigation of a beneficiary. For example, if a beneficiary is charged in relation to a homicide death, then certification of acquittal or conviction may be required before a claim may be payable. The methods and systems described herein may include instructions for automatically detecting certain causes of death, for determining payable status at a later time, or after the occurrence of a condition (e.g., by reference to court/public records), and for notifying a claimant or other party of a contested payment (e.g., via email or another electronic notification).

In some embodiments, the methods and systems herein may include the creation of ML models that are intended to ensure an optimal outcome for beneficiaries based upon information about the beneficiary. For example, a death benefit of $5,000,000 may be payable to a beneficiary. A trained ML model may analyze the income and/or dependency status of the beneficiary and determine that the beneficiary has an income of $50,000 and three dependents aged 5, 8, and 13. The ages of the beneficiary and dependents may be provided to a trained ML model, which may predict the suitability of (1) a lump sum payment, and/or (2) a series of installment/annuity payments.

As noted, in many cases, a ML model may be trained to provide accelerated death benefits to beneficiaries. Such models may include additional training geared to providing terminally ill patients with additional funds providing for "right to try" (e.g., off-label) prescriptions, homeopathic remedies, palliative/hospice care, and other therapies. In some embodiments, an ML model may provide terminally ill patients with quality of life funds that are non-therapeutic in nature (e.g., make-a-wish, or "bucket list" funds).

In some embodiments, a specific model may be trained for analyzing claims pertaining to terminal, chronic, and/or critical illnesses. Thus, in some embodiments, it should be apparent that a claimant and beneficiary may be one and the same. For example, a ML model may be trained to handle claims submitted by patients diagnosed with terminal cancer. A ML model may be trained to handle claims of patients diagnosed with non-terminal forms of cancer, and/or other non-fatal illnesses. The determination of which model(s) to use to process a patient's claims may be based upon the methods and systems verifying a diagnosis and classifying the patient on the basis of such verification.

Certain diagnoses may cause some models to supersede other models. For example, claims submitted by a patient diagnosed with gout and non-terminal cancer may be handled by a non-terminal cancer ML model either prior to, in addition to, or instead of, an ML model handling the patient's gout-related claims. It should be appreciated that the number of potential trained ML models is only limited by the number of diagnoses and sub-combinations thereof.

In one embodiment, a ML model may predict a cause of death of a patient based upon training on prior claims data. In this way, a conclusion of a cause of death reached or predicted by a trained ML model may be confirmed by, or in conflict with, an official cause of death. In such cases, further investigation may be required before a death benefit will be paid or a claim settled. In some embodiments, a trained ML model may identify a trust (e.g., a revocable trust) beneficiary of an insurance benefit, and may also provide information relating to taxation of death benefits. For example, the system may communicate with the trustee of a trust, a beneficiary, and/or another responsible party such as a legal agent/representative.

Exemplary Model Training Environment

FIG. 1 illustrates a block diagram of an exemplary computing environment 100 implementing machine-learning for insurance claim handling, in accordance with certain aspects of the present disclosure. The high-level architecture includes both hardware and software applications, as well as various data communication channels for communicating data between the various hardware and software components. Generally, the environment 100 may automatically retrieve data associated with various electronic records, data sources, and/or users (e.g., claimants and/or beneficiaries) and use this data set to implement the various machine-learning implementations discussed herein to facilitate improvements to the insurance claim handling process.

In the present aspect, the computing environment 100 may include an input data set 102, an artificial intelligence (AI) platform 104, a settlement offer 106, and an historical data 108. Input data set 102 and historical data 108 may include a plurality (e.g., thousands or millions) of electronic documents, parameters, and/or other information. As used herein, the term "data" generally refers to information related to a policy holder, which may exist in the environment 100. For example, data may include an electronic document representing an insurance policy, an insurance claim, demographic information about the policy holder, and/or information related to the type of insurance claim submitted. Examples of insurance policy data may include, without limitation: a term, begin date, death benefit, and deductible. Data may be historical or current. Although data may be related to an ongoing claim filed by a policy holder or beneficiary, in some embodiments, data may consist of raw data parameters entered by a human user of the environment 100 or which is retrieved/received from another computing system.

Data may or may not relate to the claims filing process, and while some of the examples described herein refer to health and life insurance claims, it should be appreciated that the techniques described herein may be applicable to other types of electronic documents, in other domains. For example, the techniques herein may be applicable to identifying risk factors in other insurance domains, such as agricultural insurance, homeowners insurance, vehicle insurance, renters insurance, etc. In that case, the scope and content of the data may differ, as may the techniques used for training and operating the machine learning models. As another example, data may be collected from an existing customer filing a claim, a potential or prospective customer applying for an insurance policy, and/or may be supplied by a third party such as a company other than the proprietor of the environment 100. In some cases, data may reside in paper files that are scanned or entered into a digital format by a human or by an automated process (e.g., via a scanner). Generally, data may comprise any digital information, from any source, created at any time.

Input data 102 may be loaded into an artificial intelligence system 104 to organize, analyze, and process input data 102 in a manner that facilitates claim handling by AI platform 104. The loading of input data 102 may be performed by executing a computer program on a computing device that has access to the environment 100, and the loading process may include the computer program coordinating data transfer between input data 102 and AI platform 104 (e.g., by the computer program providing an instruction to AI platform 104 as to an address or location at which input data 102 is stored).

AI platform 104 may reference this address to retrieve records from input data 102 to perform claim handling techniques. AI platform 104 may be thought of as a collection of algorithms and/or rules configured to receive and process parameters, and to produce labels and, in some embodiments, quantify claim settlement information. AI platform 104 may be used to process claim data inputs, train and operate multiple artificial neural networks (ANNs), and generate settlement offers based upon claim quantification. Herein, an ANN may be defined and/or constructed as an ANN, and/or as another artificial intelligence or machine learning algorithm, program, module, and/or model.

AI platform 104 may include an input analysis unit 120, which may include a speech-to-text unit 122 and an image processing unit 124. These may comprise, respectively, instructions for converting human speech into text and analyzing images (e.g., extracting information from a death certificate or other legal document). In this way, data may comprise audio recordings (e.g., recordings made when a customer telephones a customer service center) that may be converted to text and further used by AI platform 104. In some embodiments, customer behavior represented in data—including the accuracy and truthfulness of a customer—may be encoded by claim analysis unit 120, and used by AI platform 104 to train and operate ANN models.

Input analysis unit 120 may also include text analysis unit 126, which may include pattern matching unit 128 and natural language processing (NLP) unit 130. In some embodiments, text analysis unit 126 may determine facts regarding claim inputs (e.g., the amount of money paid under a claim). Amounts may be determined in a currency- and inflation-neutral manner, so that claim loss amounts may be directly compared. In some embodiments, text analysis unit 126 may analyze text produced by speech-to-text unit 122 or image analysis unit 124.

In some embodiments, pattern matching unit 128 may search textual claim data loaded into AI platform 104 for specific strings or keywords in text (e.g., "cardiac arrest") which may be indicative of a condition. NLP unit 130 may be used to identify, for example, entities or objects indicative of a fact (e.g., that an individual visited an emergency room). NLP unit 130 may identify human speech patterns in data, including semantic information relating to entities, such as people, buildings, businesses, etc.

Relevant verbs and objects, as opposed to verbs and objects of lesser relevance, may be determined by the use of a machine learning algorithm analyzing historical claims. For example, verbs indicating injury or surgery may be relevant verbs. In some embodiments, text analysis unit 126 may comprise text processing algorithms/techniques (e.g., lexers and parsers, regular expressions, etc.) and may emit structured text in a format which may be consumed by other components.

In the embodiment of FIG. 1, AI platform 104 may include a loss classifier 140 to classify losses by category. As discussed above, losses may be categorized as a first step according to loss type (e.g., a health insurance claim or life insurance claim). For example, loss classifier 140 may label input data 102, or portions thereof, according to positive or negative pattern matching according to pattern matching unit 128 and/or natural language processing unit 130. For example, if input data 102 includes data matching the pattern "asthma attack" and semantic information indicating that a person visited a hospital and was prescribed a nebulizer, then loss classifier 140 may classify the claim data as a health insurance claim, and the processing of the claim may proceed accordingly (e.g., by the claim data being processed in ANN unit 150 by a health insurance-specific ANN model).

ANN unit 150 may process claim data by training models with the data and/or by operating a trained ANN model with the data. ANN unit 150 may use an ANN or another suitable model, as described above. The ANN may be any suitable type of ANN, including, without limitation, a recurrent neural network or feed-forward neural network. The ANN may include any number (e.g., thousands) of nodes or "neurons" arranged in multiple layers, with each neuron processing one or more inputs to generate a decision or other output. In other embodiments, other types of artificial intelligence or machine learning algorithms, programs, modules, or models may be used.

In some embodiments, ANN models may be chained together, so that output from one model is fed into another model as input. For example, loss classifier 140 may, in one embodiment, apply input data 102 to a first ANN model that is trained to generate labels. The output (e.g., labels) of this first ANN model may be fed as input to a second ANN model which has been trained to predict claim settlement amounts based upon the presence of labels. The second ANN may be trained using an inflation-adjusted set of claim payout amounts, and respective set of risk labels, to very accurately predict the amount of money likely to be paid on a new claim, given only a new set of risk labels from the first model.

ANN unit 150 may include training unit 152, and risk indication unit 154. To train the ANN to identify risk, ANN unit 150 may access electronic claims within historical data 108. Historical data 108 may comprise a corpus of documents comprising many (e.g., millions) of insurance claims which may contain data linking a particular customer or claimant to one or more vehicles, and which may also contain, or be linked to, information pertaining to the customer. In particular, historical data 108 may be analyzed by AI platform 104 to generate claim records 110-1 through 110-n, where n is any positive integer. Each claim 110-1 through 110-n may be processed by training unit 152 to train one or more ANNs to identify claim risk factors, including by pre-processing of historical data 108 using input analysis unit 120 as described above.

ANN 150 may, from a trained model, identify labels that correspond to specific data, metadata, and/or attributes within input data 102, depending on the embodiment. For example, ANN 150 may be provided with instructions from input analysis unit 120 indicating that one or more particular type of insurance is associated with one or more portions of input data 102.

ANN 150 may identify one or more insurance types associated with the one or more portions of input data 102 (e.g., bodily injury, property damage, collision coverage, comprehensive coverage, liability insurance, med pay, or personal injury protection (PIP) insurance) and by input analysis unit 120. In one embodiment, the one or more insurance types may be identified by training the ANN 150 based upon types of peril. For example, the ANN model may be trained to determine that death or diagnosis with a terminal illness may indicate life insurance coverage.

In addition, input data 102 may indicate a particular customer and/or beneficiary. In that case, loss classifier 140 may look up additional customer information from customer data 160 and life and health database 162, respectively. For example, the age of the person and/or information pertaining to the person's life insurance policy and/or health care benefits may be obtained. The additional customer and/or life and health information may be provided to ANN unit 150 and may be used to analyze and label input data 102 and, ultimately, may be used to determine settlement offer 106. For example, ANN unit 150 may be used to quantify a settlement amount based upon inputs obtained from a person submitting a life insurance claim, or based upon a claim submitted by a person who is a holder of an existing health insurance policy. That is, in some embodiments where ANN unit 150 is trained on claim data, ANN unit 150 may quantify settlement amounts based upon raw information unrelated to the claims filing process, or based upon other data obtained during the filing of a claim (e.g., a claim record retrieved from historical data 108).

In one embodiment, the training process may be performed in parallel, and training unit 152 may analyze all or a subset of claims 110-1 through 110-n. Specifically, training unit 152 may train an ANN to identify claim risk factors in claim records 110-1 through 110-n. As noted, AI platform 104 may analyze input data 102 to arrange the historical claims into claim records 110-1 through 110-n, where n is any positive integer.

Claim records 110-1 through 110-n may be organized in a flat list structure, in a hierarchical tree structure, or by means of any other suitable data structure. For example, the claim records may be arranged in a tree wherein each branch of the tree is representative of one or more customer. There, each of claim records 110-1 through 110-n may represent a single non-branching claim, or may represent multiple claim records arranged in a group or tree.

Further, claim records 110-1 through 110-n may comprise links to customers whose corresponding data is located elsewhere. In this way, one or more claims may be associated with one or more customers via one-to-many and/or many-to-one relationships. Risk factors may be data indicative of a particular risk or risks associated with a given claim, and/or customer. The status of claim records may be completely settled or in various stages of settlement.

As used herein, the term "claim" generally refers to an electronic document, record, or file, that represents an insurance claim (e.g., a life insurance or health insurance claim) submitted by a policy holder, beneficiary, and/or legal representative of an insurance company. Herein, "claim data" or "historical data" generally refers to data directly entered by the customer or insurance company including, without limitation, free-form text notes, photographs, audio recordings, written records, receipts (e.g., doctor's visit invoices) and other information including data from legacy, including pre-Internet (e.g., paper file) systems. Notes from claim adjustors and attorneys may also be included.

In one embodiment, claim data may include claim metadata or external data, which generally refers to data pertaining to the claim that may be derived from claim data or which otherwise describes, or is related to, the claim but may not be part of the electronic claim record. Claim metadata may have been generated directly by a developer of the environment 100, for example, or may have been automatically generated as a direct product or byproduct of a process carried out in environment 100. For example, claim metadata may include a field indicating whether a claim was settled or not settled, and amount of any payouts, and the identity of corresponding payees.

Another example of claim metadata is the geographic location in which a claim is submitted, which may be obtained via a global positioning system (GPS) sensor in a device used by the person or entity submitting the claim. Yet another example of claim metadata includes a category of the claim type (e.g., term life insurance, whole life, universal life, etc.). For example, a single claim in historical data 108 may be associated with a married couple, and may include the name, address, and other demographic information relating to the couple. Additionally, the claim may include an indication of beneficiaries corresponding to the couple. The claim may include a plurality of claim data and claim metadata, including metadata indicating a relationship or linkage to other claims in historical claim data 108.

Once the ANN has been trained, quantification unit 154 may apply the trained ANN to input data 102 as processed by input analysis unit 120. In one embodiment, input analysis unit 120 may merely "pass through" input data 102 without modification. The output of the ANN, indicating quantification, such as labels pertaining to the entirety of, or portions of input data 102, may then be provided to loss classifier 140, which may insert the output of the ANN into an electronic database, such as loss data 142. Alternatively, or additionally, quantification unit 154 may use information output by the ANN to determine attributes of input data 102, and may provide those attributes to loss classifier 140.

AI platform 104 may further include customer data 160 and life and health data 162, which loss classifier 140 may leverage to provide useful input parameters to ANN unit 150. Customer data 160 may be an integral part of AI platform 104, or may be located separately from AI platform 104. In some embodiments, customer data 160 and/or life and health data 162 may be provided to AI platform 104 via separate means (e.g., via an API call) and may be accessed by other units or components of environment 100. Either may be provided by a third-party service.

Life and health data 162 may be a database comprising information describing various insurance products, and may indicate whether certain insurance products or policies include certain fields, requirements, capabilities, etc. The capabilities may be listed individually. Both of customer data 160 and/or life and health data 162 may be used to train an ANN model.

All of the information pertaining to a submitted claim applicant may then be provided to ANN unit 150, which may—based upon its prior training on claims from historical data 108—determine that a plurality of labels apply to the applicant. For example, the labels may include DECEASED, TERMINAL, SURGERY, ALLERGIES. The labels may have a respective confidence factor, and may be sorted in terms of criticality, and/or given pre-assigned weights. The labels and/or weights may be stored in risk indication data 142, in one embodiment.

In some embodiments, pattern matching unit 128 and natural language processing unit 130 may act in conjunction to determine labels. For example, pattern matching unit 128 may include instructions to identify words indicating a life insurance claim (e.g., "death," "deceased," and/or "coroner"). Matched data may be provided to natural language processing unit 130, which may further process the matched data to determine parts of speech such as verbs and objects, as well as relationships between the objects. The output of natural language processing unit 130 may be provided to ANN unit 150 and used by training unit 152 to train an ANN model to label insurance types. In one embodiment, ANN unit 150 may be provided with respective labeled claim type sets (e.g., a first labeled set of life insurance claims, a second set of health insurance claims, etc.) as training data, to be trained to predict the claim type. The methods and systems described herein may help risk-averse customers to lower their insurance premiums by more efficiently quantifying settlement amounts. All of the benefits provided by the methods and systems described herein may be realized much more quickly than traditional modeling approaches, with less bias than approaches applied by humans.

Exemplary Claim Settlement System

Figure 2:
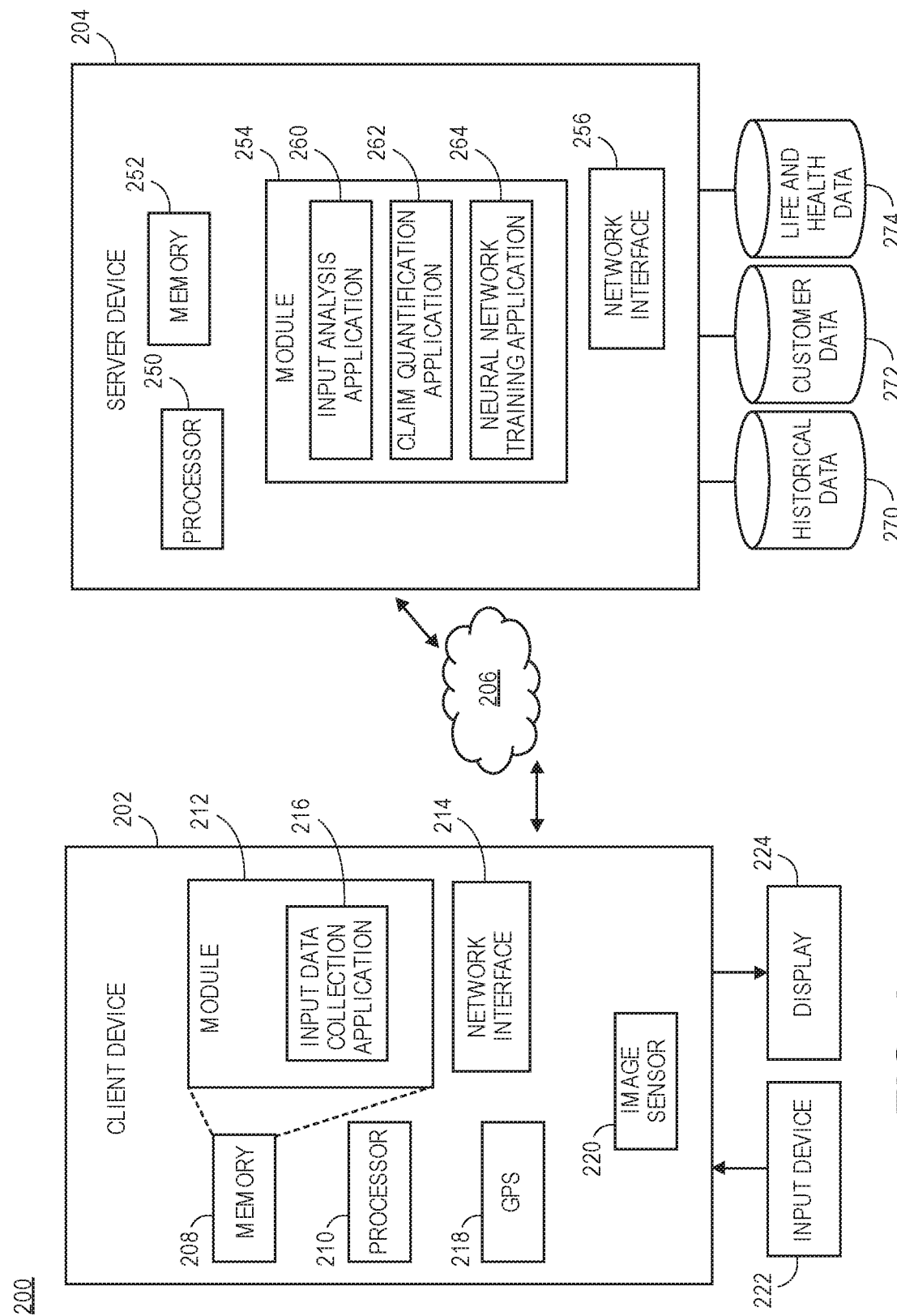
FIG. 2 depicts an exemplary computing environment implementing collection and processing of user input and machine learning implementing artificial intelligence techniques for life and health insurance claim handling.

Computing environment 200 is depicted as including a client device 202, a server device 204, and a network 206; however, the aspects described herein may include any suitable number of such components. Client device 202 and server device 204 may communicate via network 206 to collect data, train and/or operate ANN models, transfer trained ANN models, and display information to a user. FIG. 2 may correspond to one embodiment of environment 100 of FIG. 1. Client device 202 and/or server device 204 may be implemented as any suitable computing device(s) or mobile device(s) such as a laptop, smart phone, tablet, server, wearable device, smart watch, smart glasses, etc.

Client device 202 may include a memory 208 and a processor 210 for storing and executing, respectively, a module 212. While referred to in the singular, processor 210 may include any suitable number of processors of one or more types (e.g., one or more CPUs, graphics processing units (GPUs), cores, etc.). Similarly, memory 208 may include one or more persistent memories (e.g., a hard drive and/or solid state memory). Although only a single client 202 is depicted in FIG. 2, it should be appreciated that it may be advantageous in some embodiments to provision multiple clients (e.g., thousands or more) for the deployment and functioning of environment 200.

Module 212, stored in memory 208 as a set of computer-readable instructions, may be related to an input data collection application 216 which, when executed by the processor 210, causes input data to be stored in memory 208. The data stored in memory 208 may correspond to, for example, raw data retrieved from input data 102. Input data collection application 216 may be implemented as web page (e.g., HTML, JavaScript, CSS, etc.) and/or as a mobile application for use on a standard mobile computing platform.

Input data collection application 216 may store information in memory 208, including the instructions required for its execution. While the user is using input data collection application 216, scripts and other instructions comprising input data collection application 216 may be represented in memory 208 as a web or mobile application. The input data collected by input data collection application 216 may be stored in memory 208 and/or transmitted to server device 204 by network interface 214 via network 206, where the input data may be processed as described above to train an ANN, and/or to collect information pertaining to an insurance claim and process the claim using the collected information via the trained ANN. In one embodiment, input data collection application 216 may be data used to train a model (e.g., scanned claim data).

Client device 202 may also include GPS sensor 218, an image sensor 220, user input device 222 (e.g., a keyboard, mouse, touchpad, and/or other input peripheral device) and display interface 224 (e.g., an LED screen). User input device 222 may include components that are integral to client device 202, and/or exterior components that are communicatively coupled to client device 202, to enable client device 202 to accept inputs from the user. Display 224 may be either integral or external to client device 202, and may employ any suitable display technology. In some embodiments, input device 222 and display 224 are integrated, such as in a touchscreen display. Execution of the module 212 may further cause the processor 210 to associate device data collected from client 202 such as a time, date, and/or sensor data (e.g., a camera for photographic or video data) with customer data, such as data retrieved from customer data 160 and life and health data 162, respectively.

A set of information may be obtained from input device 222, and may include information relating to claims previously-filed by the user. Such previously-filed information may be stored in, for example, customer data 272 and may be related to the obtained information using one or more common identifiers.

In some embodiments, client 202 may receive data from loss data 142 and settlement offer 106. Such data, indicating predicted settlement amounts, and/or full-fledged binding offers of settlement, may be presented to a user of client 202 by a display interface 224. The user may interact with such information via input device 222 and display 224.

Execution of the module 212 may further cause the processor 210 of the client 202 to communicate with the processor 250 of the server 204 via network interface 214 and network 206. As an example, an application related to module 212, such as input data collection application 216, may, when executed by processor 210, cause a user interface to be displayed to a user of client device 202 via display interface 224. The application may include graphical user input (GUI) components for acquiring data (e.g., a photograph of a death certificate, hospital bill, etc.) from image sensor 220, GPS coordinate data from GPS sensor 218, and textual user input (e.g., the name of a deceased person) from user input device(s) 222. The processor 210 may transmit the aforementioned acquired data to server 204, and processor 250 may pass the acquired data to a trained ANN, which may accept the acquired data and perform a computation (e.g., training of the model, or application of the acquired data to a trained ANN model to obtain a result). With specific reference to FIG. 1, the data acquired by client 202 may be transmitted via network 206 to a server implementing AI platform 104, and may be processed by input analysis unit 120 before being applied to a trained ANN by loss classifier 140.

As described with respect to FIG. 1, the processing of input from client 202 may include associating customer data 160 and life data and health data 162 with the acquired data. The output of the ANN may be transmitted, by a loss classifier corresponding to loss classifier 140 in server 204, to client 202 for display (e.g., in display 224) and/or for further processing.

Network interface 214 may be configured to facilitate communications between client 202 and server 204 via any hardwired or wireless communication network, including network 206 which may be a single communication network, or may include multiple communication networks of one or more types (e.g., one or more wired and/or wireless local area networks (LANs) and/or one or more wired and/or wireless wide area networks (WANs) such as the Internet). Client 202 may cause claim filing data to be stored in server 204 memory 252 and/or a remote insurance related database such as customer data 160.

Server 204 may include a processor 250 and a memory 252 for executing and storing, respectively, a module 254. Module 254, stored in memory 252 as a set of computer-readable instructions, may facilitate applications related to processing and/or collecting claim filing related data, including claim data and claim metadata, and insurance policy data. For example, module 254 may include input analysis application 260, claim quantification application 262, and ANN training application 264, in one embodiment.

Input analysis application 260 may correspond to input analysis unit 120 of environment 100 of FIG. 1. Claim quantification application 262 may correspond to quantification unit 152 of environment of FIG. 1, and ANN training application 264 may correspond to ANN unit 150 of environment 100 of FIG. 1. Module 254 and the applications contained therein may include instructions which, when executed by processor 250, cause server 204 to receive and/or retrieve input data from (e.g., raw data and/or an electronic claim) from client device 202. In one embodiment, input analysis application 260 may process the data from client 202, such as by matching patterns, converting raw text to structured text via natural language processing, by extracting content from images, by converting speech to text, and so on.

Throughout the aforementioned processing, processor 250 may read data from, and write data to, a location of memory 252 and/or to one or more databases associated with server 204. For example, instructions included in module 254 may cause processor 250 to read data from an historical data 270, which may be communicatively coupled to server device 204, either directly or via communication network 206. Historical data 270 may correspond to historical data 108, and processor 250 may contain instructions specifying analysis of a series of electronic claim documents from historical data 270, as described above with respect to claims 110-1 through 110-n of historical data 108 in FIG. 1.

Processor 250 may query customer data 272 and life and health data 274 for data related to respective electronic claim documents and raw data, as described with respect to FIG. 1. In one embodiment, customer data 272 and life and health data 274 correspond, respectively, customer data 160 and 162. In another embodiment, customer data 272 and/or life and health data 274 may not be integral to server 204. Module 254 may also facilitate communication between client 202 and server 204 via network interface 256 and network 206, in addition to other instructions and functions.

Although only a single server 204 is depicted in FIG. 2, it should be appreciated that it may be advantageous in some embodiments to provision multiple servers (e.g., thousands or more) for the deployment and functioning of environment 200. For example, the pattern matching unit 128 and natural language processing unit 130 of input analysis unit 120 may require CPU-intensive processing. Therefore, deploying additional hardware may provide additional execution speed. Each of historical data 270, customer data 272, life and health data 274, and risk indication data 276 may be geographically distributed, thus requiring or benefiting from more than one server.

While the databases depicted in FIG. 2 are shown as being communicatively coupled to server 204, it should be understood that historical claim data 270, for example, may be located within separate remote servers or any other suitable computing devices communicatively coupled to server 204. Distributed database techniques (e.g., sharding and/or partitioning) may be used to distribute data. In one embodiment, free or open source software such as Apache Hadoop® may be used to distribute data and run applications (e.g., claim quantification application 262). It should also be appreciated that different security needs, including those mandated by laws and government regulations, may in some cases affect the embodiment chosen, and configuration of services and components.

In a manner similar to that discussed above in connection with FIG. 1, historical claims from historical claim data 270 may be ingested by server 204 and used by ANN training application 264 to train an ANN. Then, when module 254 processes input from client 202, the data output by the ANN(s) (e.g., data indicating labels, amounts, weights, etc.) may be passed to claim quantification application 262 for computation of a claim amount, which may be expressed in integer, decimal, or any other suitable format. The predicted claim amount may then be transmitted to client device 202 and/or another device, in raw numeric form, or interpolated into a settlement offer (e.g., settlement offer 106). The predicted claim settlement amount may be used for further processing by client device 202, server device 204, or another device.

It should be appreciated that the client/server configuration depicted and described with respect to FIG. 2 is but one possible embodiment. In some cases, a client device such as client 202 may not be used. In that case, input data may be entered—programmatically, or manually—directly into device 204. A computer program or human may perform such data entry. In that case, device may contain additional or fewer components, including input device(s) and/or display device(s). In another embodiment, all processing may take place in client 202 and a server 204 may not be used. In one embodiment, a client device 202 may be an integral device to a self-service workstation (e.g., as part of a kiosk in an insurance agent location, or in a medical facility).

Weights and claim settlement amounts that may be generated, respectively, during the training and operation of an ANN may appear counter-intuitive. For example, the weights may appear to be random or patternless numbers. Predicted claim settlement amounts may appear to be too high or too low and may require further investigation to identify decision factors (i.e., reasoning about model weights).

In some embodiments, environmental data and prior related claims may be used to train the ANN. For example, environmental data may include such information as the location in which the claimant lives (e.g., desert, urban, mountainous, etc.). Environmental data may be determined by analyzing information added to a submitted claim by a claim filer or other individual (e.g., a claims adjuster) and/or information that is obtained by accessing a third-party API, such as a weather API. Prior related claims may be claims identified as relating to a particular user/policyholder.

In operation, the user of client device 202, by operating input device 222 and viewing display 224, may open input data collection application 216, which depending on the embodiment, may allow the user to enter personal information. The user may be an employee of a company controlling AI platform 104 or a customer or end user of the company. For example, input data collection application 216 may walk the user through the steps of submitting a claim.

Before the user can fully access input data collection application 216, the user may be required to authenticate (e.g., enter a valid username and password). The user may then utilize input data collection application 216. Module 212 may contain instructions that identify the user and cause input data collection application 216 to present a particular set of questions or prompts for input to the user, based upon any information input data collection application 216 collects, including without limitation information about the user.

In one embodiment, the ANNs used herein to settle claims may be used on an opt-in basis. For example, a user of an insurer web site may be presented with the option of having a human or trained ANN evaluate a filed claim. As noted, it may be possible to package the trained ANN for distribution to client 202 (i.e., the trained ANN may be operated on the client 202 without the use of a server 204). In that case, the claimant may submit a claim and receive an instantaneous settlement offer. The user may accept the offer even if the user is not connected to any network, and the user's acceptance may be recorded in the device, such as in memory 208. At a later time, when the device is again connected to a network, the user's acceptance may be transmitted to an insurer (e.g., to server device 204 via network 206). At that stage, the insurer may generate a payment and send the payment to the user.

Module 212 may identify a subset of historical data 270 to be used in training an ANN, and/or may indicate to server device 204 that the use of a particular ANN model or models is appropriate. For example, if the user is submitting a health insurance claim, then module 212 may transmit the user's name and personal information, the location of the user as provided by GPS 218, a photograph of a bill captured by image sensor 220, a description of services (e.g., preselected from a list of services) and other information to server device 204. Any of the information known about the claim filer may be presented using various graphical user interface controls (e.g., radio boxes, drop-down menus, etc.) which constrain the set of information that the claim filer may submit. In some embodiments, free-form information may be allowed to be entered via input device 222.

In some embodiments, location data from client device 202 may be used by an ANN to determine claim settlement amounts. For example, if the user is known to live in Chicago for nine months of the year, and in a rural area for three months of the year, then the user/beneficiary may be provided with an adjusted settlement or installment payment adjusted according to a cost-of-living index for the different times of year.

By the time the user of client 202 files a claim, server 204 may have already processed the electronic claim records in historical data 270 and trained an ANN model to analyze the information provided by the user to output claim settlement predictions, labels, and/or weights.

For example, the partner of a 79-year-old recently-deceased individual may access client 202 by opening an application (e.g., input data collection application 216). The application may provide the partner with the option to submit a life insurance claim under a joint or individual life insurance policy (e.g., term life, whole life, etc.). The application may provide the partner with the option of selecting the name of the deceased from a menu, and may pre-fill fields with known personal information about the deceased (e.g., name, age, address, telephone number, etc.). The application may allow the partner to select pre-filled information, and/or to enter their own information.

The application may provide the ability to attach documents (e.g., a photograph of a death certificate) and may also prompt the claim-filing partner to select the cause of death from a pre-filled list, or to enter information relating to the cause of death. A time/date of death may be solicited. The application may provide the partner with the ability to request that funeral expenses be paid to a specific mortuary, and such requests may be entered separately into the application, and may be subject to expedited review/processing.

The application may allow the claim filer, partner or otherwise, to select one or more beneficiaries on behalf of the deceased. Then, the claim filer may have the option of submitting the claim. One or more ANNs may then analyze the inputs provided by the claim filer. For example, a first ANN may be applied which analyzes the death certificate. Another ANN may analyze the inputs provided by the claimant. The outputs of the two ANNs may be harmonized. A third ANN may be selected based upon one or more criteria (e.g., the age of the deceased, the age of the policy, the status of the policy, etc.). The third ANN may analyze the harmonized outputs of the first two ANNs to predict a claim settlement amount. The claim settlement amount may be based upon claims previously settled for similar life insurance policies and/or insureds.

Depending upon the result of the ANN analyzing the partner's claim, the application may provide the partner with an immediate settlement amount, or may queue the claim for further review. In the case that an immediate amount offer is made, then the application may contain further instructions that will allow the claimant to accept the offer by providing an e-signature or other manifestation of acceptance.

In some embodiments, a component (e.g., input analysis application 260 or a trained ANN) may analyze the claim information and determine that further information is necessary before the claim may be settled. For example, a doctor's signature may be required in order for some diagnoses under accelerated death benefits and/or payments under health insurance policies to be acceptable. In some embodiments, a particular data point may cause the claim to be flagged as requiring human review (e.g., if the cause of death is listed as a homicide). In such cases, particular supporting documentation (e.g., police reports) may be automatically requested from the claimant. It should be appreciated that other specific constraints may be encoded into the methods and systems. For example, a health insurance claim less that $25 may be subject to a less scrutinizing ANN than a claim over $5000. The claimed amount may, in some cases, be an input provided to the trained ANN, and historical claims used in training the ANN may be labeled according to their dollar value.

In one embodiment, the death of a policy holder may be automatically detected via the monitoring of public records and a claim approved or placed in condition for approval —subject to beneficiary acceptance—through automated means. In such embodiments, the information that would normally be provided via the partner in the above example may be extracted from public records. In either case, the information may be analyzed by the trained ANN to determine an appropriate claim settlement amount. In the automatic detection case, such claim settlement may be communicated (e.g., mailed, emailed, etc.) to the beneficiary of record, along with information informing the beneficiary of how to effectively accept the settlement.

In embodiments wherein installment payments are made, such as in the case of accelerated death benefits, an ANN may be used to periodically review a claim of a beneficiary and to adjust benefits accordingly. For example, the patient's electronic medical records may be analyzed using the ANN via a batch process, and if the patient's condition improves, the benefit may be lowered or may be subject to termination. On the other hand, if the patient's condition worsens, the benefit amount may be increased correspondingly.

All of the information collected may be associated with a claim identification number so that it may be referenced as a whole. Server 204 may process the information as it arrives, and thus may process information collected by input data collection application 216 at a different time than server 204 processes the audio recording in the above example. Once information sufficient to process the claim has been collected, server 204 may pass all of the processed information (e.g., from input analysis application) to claim quantification application 262, which may apply the information to the trained ANN model.

As noted, more than one trained ANN model may be used to analyze the claim. Therefore, a first trained ANN model may be used to predict an installment payment schedule including respective installment amounts. A second trained ANN model may be used to predict a lump sum payment. Quantification unit may provide the results of the first and second ANN models to settlement offer 106 in the form of a binary choice to a user, wherein the user may compare the first and second settlement offers and accept either of the two. Furthermore, each respective choice may have a limited and differing time window within which to accept. Such automated scheduling may assist the insurer in meeting deadlines. This is an important benefit of the methods and systems disclosed herein, because failure to timely process life insurance claims may cause the insurer to be subject to penalties in some jurisdictions.

While the claim or application processing is pending, client device 202 may display an indication that the processing of the claim is ongoing and/or incomplete. When the claim is ultimately processed by server 204, an indication of completeness may be transmitted to client 202 and displayed to user, for example via display 224. Missing information may cause the model to abort with an error.

In some embodiments, the labels and/or characterization of input data (claims and otherwise) performed by the systems and methods described herein may be capable of dynamic, incremental, and or online training. Specifically, a model that has been trained on a set of electronic claim records from historical data 270 may be updated dynamically, such that the model may be updated on a much shorter time scale. For example, the model may be adjusted weekly or monthly to take into account newly-settled claims. In one embodiment, the settlement of a claim may trigger an immediate update of one or more ANN models included in the AI platform. For example, the settlement of a claim involving a particular type of cancer may trigger updates to a set of personal injury ANN models pertaining to cancer patients. In some embodiments, a human reviewer or team of reviewers may be responsible for approving the generated labels and any associated weightings before they are used.

While FIG. 2 depicts a particular embodiment, the various components of environment 100 may interoperate in a manner that is different from that described above, and/or the environment 100 may include additional components not shown in FIG. 2. For example, an additional server/platform may act as an interface between client device 202 and server device 204, and may perform various operations associated with providing the labeling and/or risk analysis operations of server 204 to client device 202 and/or other servers.

Exemplary Artificial Neural Network

Figure 3:
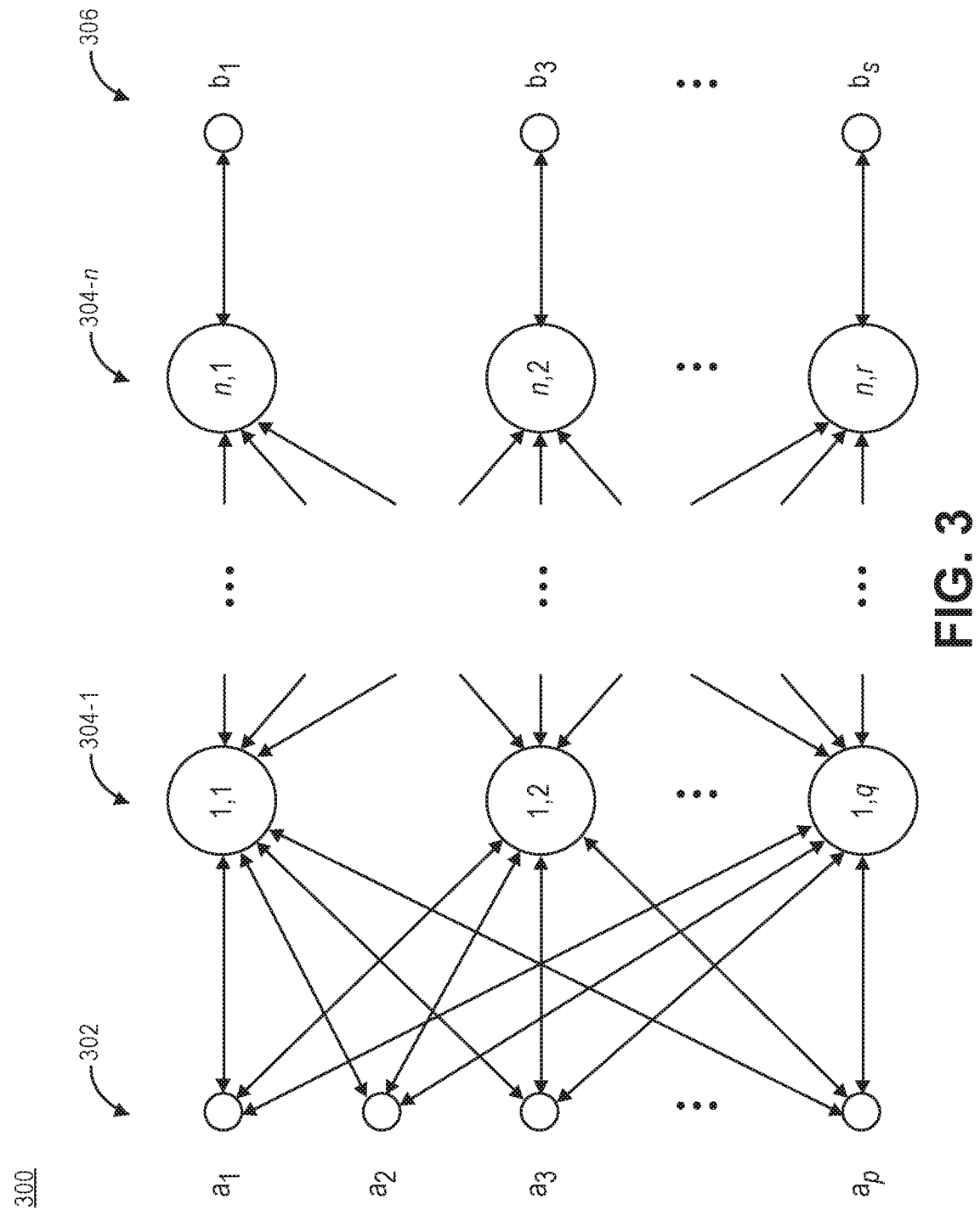
FIG. 3 depicts an exemplary neural network which may be trained and operated by the neural network unit of FIG. 1 or the neural network training application of FIG. 2, according to one embodiment and scenario.

FIG. 3 depicts an exemplary artificial neural network (ANN) 300 which may be trained by ANN unit 150 of FIG. 2 or ANN training application 264 of FIG. 2, according to one embodiment and scenario. The exemplary ANN 300 may include layers of neurons, including input layer 302, one or more hidden layers 304-1 through 304-$n$, and an output layer 306. Each layer comprising ANN 300 may include any number of neurons—i.e., q and r may be any positive integers. It should be understood that ANNs may be used to achieve the methods and systems described herein that are of a different structure and configuration than those depicted in FIG. 3.

Input layer 302 may receive different input data. For example, input layer 302 may include a first input ai which represents an insurance type (e.g., PPO health insurance), a second input a2 representing patterns identified in input data, a third input a3 representing the age of the patient, a fourth input a4 representing the name of the hospital in which service was rendered, a fifth input a5 representing whether a claim was paid or not paid, a sixth input a6 representing an inflation-adjusted dollar amount claimed by a provider, and so on. Input layer 302 may comprise thousands or more inputs. In some embodiments, the number of elements used by ANN 300 may change during the training process, and some neurons may be bypassed or ignored if, for example, during execution of the ANN, they are determined to be of less relevance.

Each neuron in hidden layer(s) 304-1 through 304-$n$ may process one or more inputs from input layer 302, and/or one or more outputs from a previous one of the hidden layers, to generate a decision or other output. Output layer 306 may include one or more outputs each indicating a dollar value, boolean, and/or weight describing one or more inputs. A label may indicate a percentage of the claimed amount (e.g., 85%) or an indication of whether to pay or not (PAY, NO-PAY). In some embodiments, however, outputs of ANN 300 may be obtained from a hidden layer 304-1 through 304-$n$ in addition to, or in place of, output(s) from output layer(s) 306.

In some embodiments, each layer may have a discrete, recognizable, function with respect to input data. For example, if n=3, a first layer may analyze one dimension of inputs, a second layer a second dimension, and the final layer a third dimension of the inputs, where all dimensions are analyzing a distinct and unrelated aspect of the input data. For example, the dimensions may correspond to aspects of a health insurance considered strongly determinative, then those that are considered of intermediate importance, and finally those that are of less relevance.

In other embodiments, the layers may not be clearly delineated in terms of the functionality they respectively perform. For example, two or more of hidden layers 304-1 through 304-$n$ may share decisions relating to settlement prediction, with no single layer making an independent decision.

In some embodiments, ANN 300 may be constituted by a recurrent ANN, wherein the calculation performed at each neuron is dependent upon a previous calculation. It should be appreciated that recurrent ANNs may be more useful in performing certain tasks, such as predicting the amount to pay to a claimant under claims given the history of other claims paid to the claimant. Therefore, in one embodiment, a recurrent ANN may be trained with respect to a specific piece of functionality with respect to environment 100 of FIG. 1.

Figure 4:
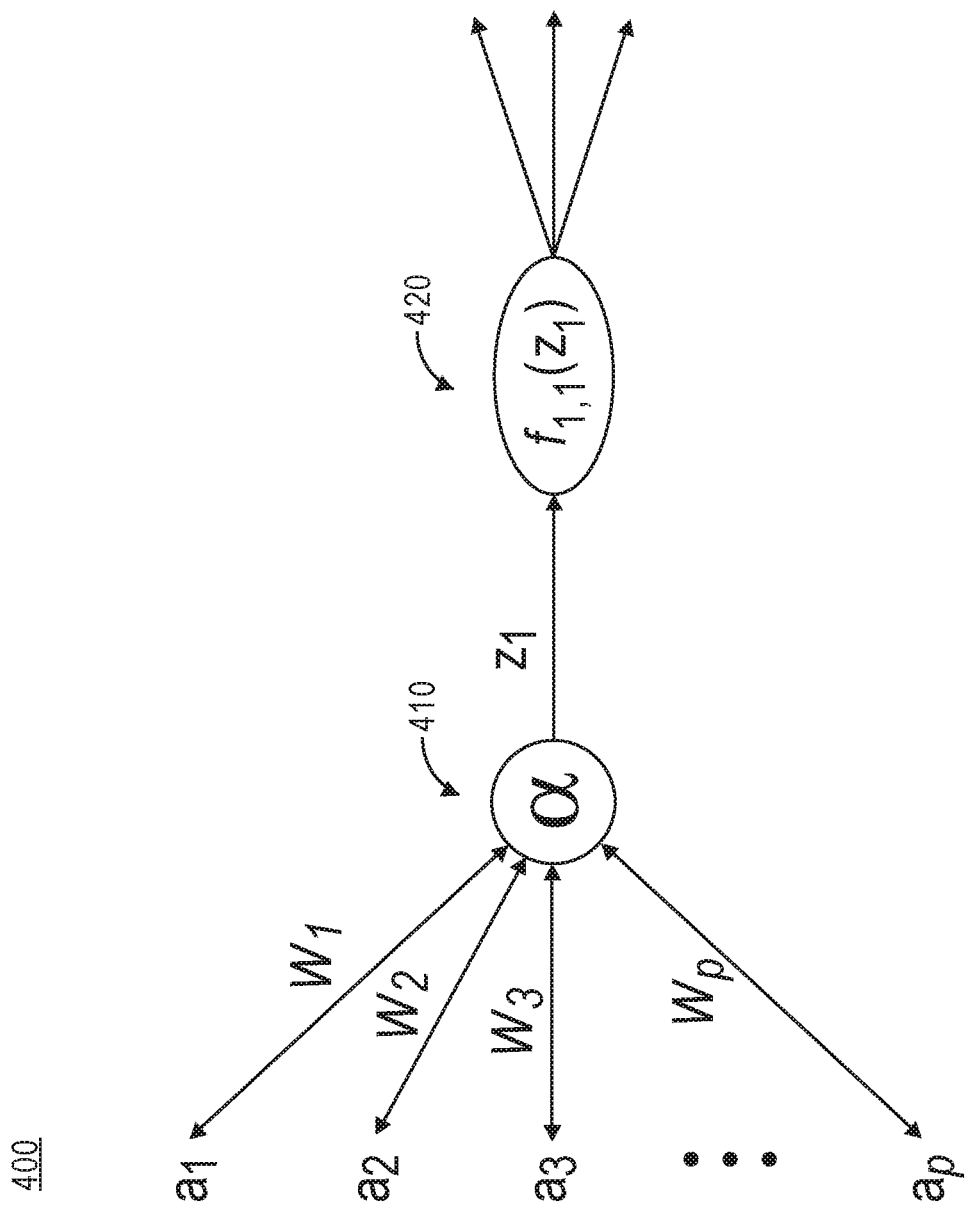
FIG. 4 depicts an exemplary neuron, which may be included in the neural network of FIG. 3, according to one embodiment and scenario.

FIG. 4 depicts an example neuron 400 that may correspond to the neuron labeled as "1,1" in hidden layer 304-1 of FIG. 3, according to one embodiment. Each of the inputs to neuron 400 (e.g., the inputs comprising input layer 302) may be weighted, such that input ai through ap corresponds to weights wi through wp, as determined during the training process of ANN 300. It should be appreciated that weights may be very complex sets of variables that may appear non-intuitive when viewed by humans.

In some embodiments, some inputs may lack an explicit weight, or may be associated with a weight below a relevant threshold. The weights may be applied to a function a, which may be a summation and may produce a value zi which may be input to a function 420, labeled as $f_{1,1}(z_1)$. The function 420 may be any suitable linear or non-linear, or sigmoid, function. As depicted in FIG. 4, the function 420 may produce multiple outputs, which may be provided to neuron(s) of a subsequent layer, or used directly as an output of ANN 300. For example, the outputs may correspond to index values in a dictionary of labels, or may be calculated values used as inputs to subsequent functions.

It should be appreciated that the structure and function of the ANN 300 and neuron 400 depicted are for illustration purposes only, and that other suitable configurations may exist. For example, the output of any given neuron may depend not only on values determined by past neurons, but also future neurons. In general, training the neural network model may include establishing a network architecture, or topology, and adding layers that may be associated with one or more activation functions (e.g., a rectified linear unit, soft max, etc.) in addition to loss functions and/or optimization functions. Multiple different types of ANNs may be employed, including without limitation, recurrent neural networks, convolutional neural networks, and deep learning neural networks.

Data sets used to train the ANN(s) may be divided into training, validation, and testing subsets; these subsets may be encoded in an N-dimensional tensor, array, matrix, or other suitable data structures. Training may be performed by iteratively training the network using labeled training samples. Training of the ANN may produce byproduct weights, or parameters which may be initialized to random values. The weights may be modified as the network is iteratively trained, by using one of several gradient descent algorithms, to reduce loss and to cause the values output by the network to converge to expected, or "learned", values.

In one embodiment, a regression neural network may be selected which lacks an activation function, wherein input data may be normalized by mean centering, to determine loss and quantify the accuracy of outputs. Such normalization may use a mean squared error loss function and mean absolute error. The ANN model may be validated and cross-validated using standard techniques such as hold-out, K-fold, etc. In some embodiments, multiple ANNs may be separately trained and operated, and/or separately trained and operated in conjunction.

Exemplary Electronic Claim Processing

The precise manner by which the one or more ANNs employ machine learning to predict claim settlement amounts and/or percentages may differ depending on the content and arrangement of training documents within the historical data (e.g., historical data 108 of FIG. 1 and historical data 270 of FIG. 2) and the input data provided by customers or users of the AI platform (e.g., input data 102 of FIG. 1 and the data collected by input data collection application 216 of FIG. 2), as well as the data that is joined to the historical data and input data, such as customer data 160 of FIG. 1 and customer data 272 of FIG. 2, and customer data 160 of FIG. 1 and life and health data 274 of FIG. 2.

The initial structure of the ANN(s) (e.g., the number of neural networks, their respective types, number of layers, and neurons per layer, etc.) may also affect the manner in which the trained neural network (or other artificial intelligence or machine learning algorithm, program, module, or model) processes the input and claims. Also, as noted above, the output produced by neural networks may be counterintuitive and very complex. For illustrative purposes, intuitive and simplified examples will be discussed in connection with FIG. 5.

Figure 5:
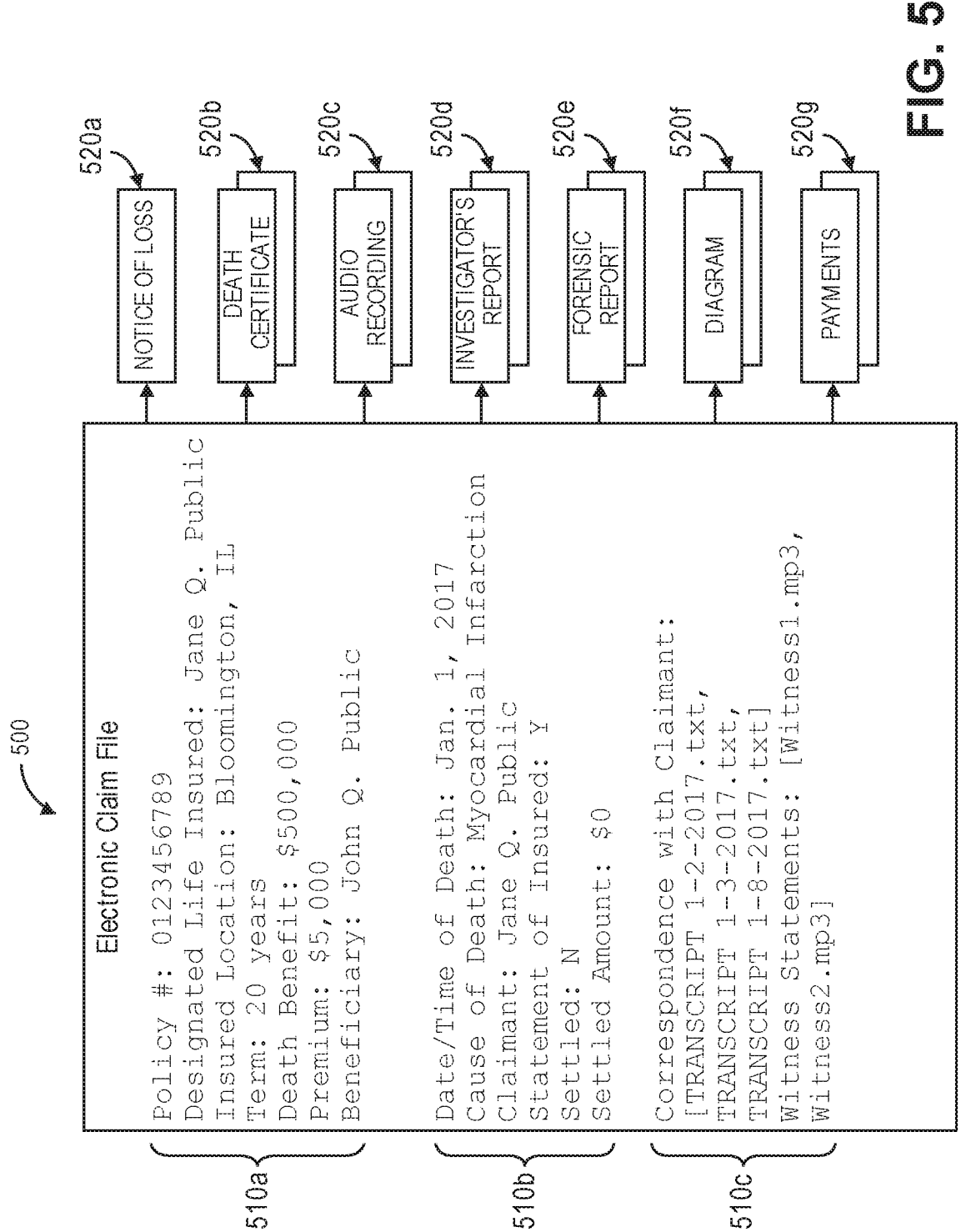
FIG. 5 depicts content of an exemplary electronic life claim record that may be processed by an artificial neural network, in one embodiment.

FIG. 5 depicts text-based content of an exemplary electronic claim record 500 which may be processed using an ANN, such as ANN 300 of FIG. 3 or a different ANN generated/trained by ANN unit 150 of FIG. 1 or ANN training application 264 of FIG. 2. The term "text-based content" as used herein includes printing (e.g., characters A-Z and numerals 0-9) in addition to non-printing characters (e.g., whitespace, line breaks, formatting, and control characters). Text-based content may be in any suitable character encoding, such as ASCII or UTF-8 and text-based content may include HTML.

Although text-based-content is depicted in the embodiment of FIG. 5, as discussed above, claim input data may include images, including hand-written notes, and the AI platform may include an ANN trained to recognize handwriting and to convert hand-writing to text. Further, "text-based content" may be formatted in any acceptable data format, including structured query language (SQL) tables, flat files, hierarchical data formats (e.g., XML, JSON, etc) or as other suitable electronic objects. In some embodiments, image and audio data may be fed directly into the neural network(s) without being converted to text first.

With respect to FIG. 5, electronic claim record 500 includes three sections 510a-510c, which respectively represent policy information, loss information, and external information. Policy information 510a may include information about the insurance policy under which the claim has been made, including the person to whom the policy is issued, the name of the insured and any additional insureds, the doctor or hospitals related to the insured, mortality tables, the location of the insured, etc. Policy information 510a may be read, for example by input analysis unit 120 analyzing historical data, such as historical data 108 and individual claims, such as claims 110-1 through 110-n.

Additional information about the insured and the circumstances of the claim may be obtained from data sources and joined to input data. For example, additional customer data may be obtained from customer data 160 or customer data 272, and additional data may be obtained from life and health data 162 and life and health data 274.

In addition to policy information 510a, electronic claim record 500 may include loss information 510b. Loss information generally corresponds to information regarding a loss event, such as a medical event, death, accident and/or other peril. As noted, herein "death" for purposes of life insurance payment may include terminal and/or chronic diagnoses. Loss information 510b may indicate the date and time of the loss, the type of loss, whether personal injury occurred, whether the insured made a statement in connection with the loss, whether the loss was settled, and if so for how much money.

In some embodiments, more the than one loss may be represented in loss information 510b. For example, a single accident may give rise to multiple losses under a given policy, for example the simultaneous (or near-simultaneous) death of two related persons.

In addition to loss information, electronic claim record 500 may include external information 510c, including but not limited to correspondence with the policyholder/claimant, statements made by the policyholder/claimant, etc. External information 510c may be textual, audio, or video information. The information may include file name references, or may be file handles or addresses that represent links to other files or data sources, such as linked data 520a-g. It should be appreciated that although only links 520a-g are shown, more or fewer links may be included, in some embodiments.

Electronic claim record 500 may include links to other records, including other electronic claim records. For example, electronic claim record 500 may link to notice of loss 520a, one or more photographs 520b, one or more audio recordings 520c, one or more investigator's reports 520d, one or more forensic reports 520e, one or more diagrams 520f, and one or more payments 520g. Data in links 520a-520g may be ingested by an AI platform such as AI platform 120. For example, as described above, each claim may be ingested and analyzed by input analysis unit 120.

AI platform 104 may include instructions which cause input analysis unit 120 to retrieve, for each link 520a-520g, all available data or a subset thereof. Each link may be processed according to the type of data contained therein; for example, with respect to FIG. 1, input analysis unit 120 may process, first, all images from one or more photograph 520b using image processing unit 124. Input analysis unit 120 may process audio recording 520c using speech-to-text unit 122.

In some embodiments, a relevance order may be established, and processing may be completed according to that order. For example, portions of a claim that are identified as most dispositive of payment may be identified and processed first. If, in that example, they are dispositive of payment, then processing of further claim elements may be abated to save processing resources.

Once the various input data comprising electronic claim record 500 has been processed, the results of the processing may, in one embodiment, be passed to a text analysis unit, and then to neural network (or other artificial intelligence or machine learning algorithm, program, module, or model). If the AI platform is being trained, then the output of input analysis unit 120 may be passed directly to neural network unit 150. The neurons comprising a first input layer of the neural network being trained by neural network unit 150 may be configured so that each neuron receives particular input(s) which may correspond, in one embodiment, to one or more pieces of information from policy information 510*a*, loss information 510*b*, and external information 510C. The electronic claim record 500 may be regressed by one or more neural network.

Similarly, one or more input neurons may be configured to receive particular input(s) from links 520*a*-520*g*. If the AI platform is being used to accept input to predict a settlement amount during the claims filing process, then the processing may begin with the use of an input collection application, as discussed with respect to one embodiment in FIG. 2. Some of the links may include references to other related data sets. For example, link 520*g* may include a link to beneficiaries under the policy.

In some embodiments, analysis of input entered by a user may be performed on a client device, such as client device 202. In that case, output from input analysis may be transmitted to a server, such as server 204, and may be passed directly as input to neurons of an already-trained neural network, such as a neural network trained by neural network training application 264.

The trained model may be configured so that inputting sample parameters, such as those in the example electronic claim record 500, may accurately predict, for example, the estimate of damage ($25,000) and settled amount ($24,500). In this case, random weights may be chosen for all input parameters. The model may then be provided with training data from claims 110-1 through 110-*n*, which are each pre-processed by the techniques described herein with respect to FIGS. 1 and 2 to extract individual input parameters. The electronic claim record 500 may then be tested against the model, and the model trained with new training data claims, until the predicted dollar values and the correct dollar values converge.

The methods and systems described herein may be capable of analyzing decades of electronic claim records to build neural network or other machine learning models, and the formatting of electronic claim records may change significantly from decade to decade, even year to year. Therefore, it is important to recognize that the flexibility built into the methods and systems described herein allows electronic claim records in disparate formats to be consumed and analyzed. Furthermore, FIG. 5 depicts a life insurance claim for expository purposes, but in some embodiments other life claim types may be used, such as health insurance claims.

Exemplary Computer-Implemented Method

Figure 6:
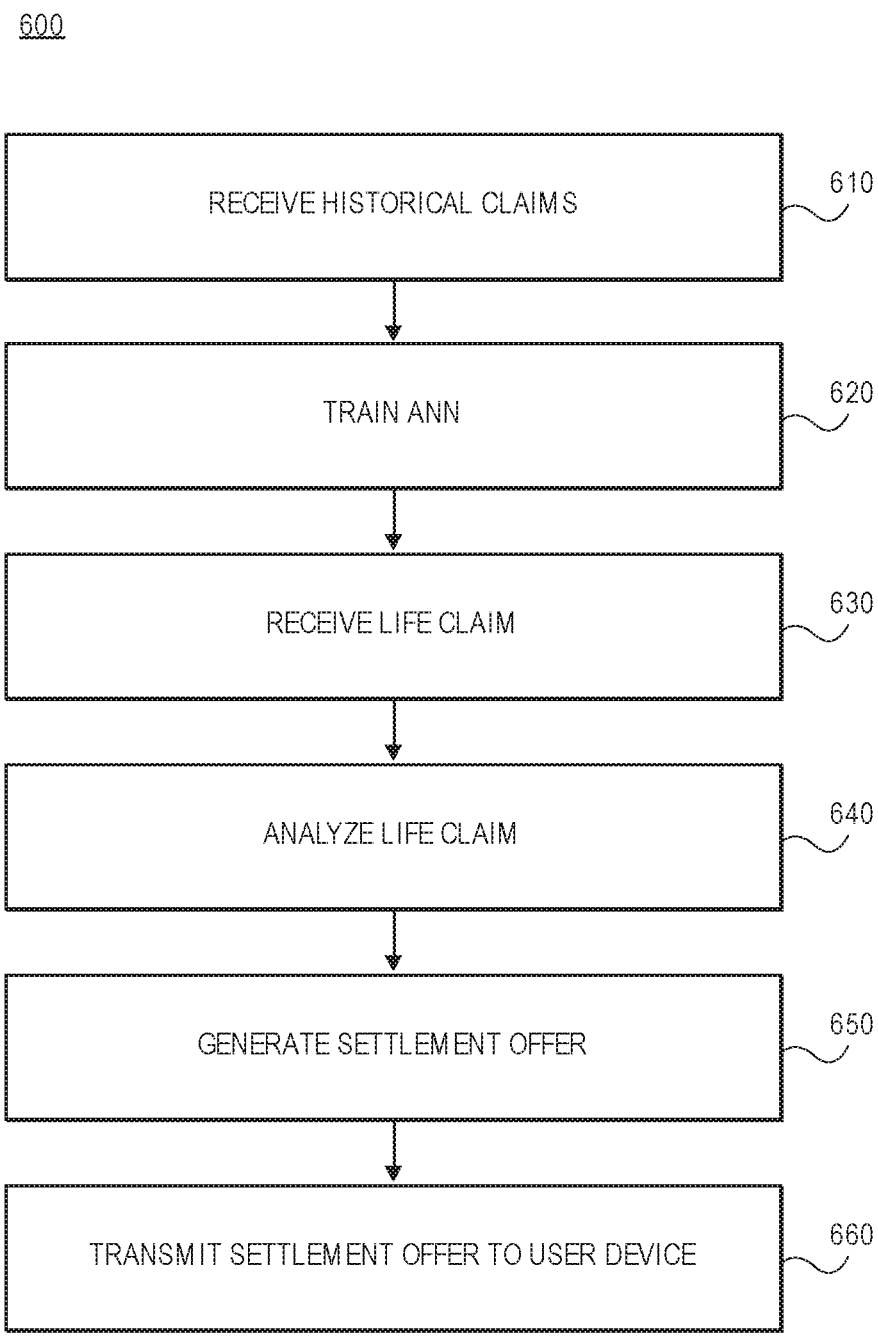
FIG. 6 depicts a flow diagram of an exemplary computer-implemented method of training an artificial neural network to handle insurance claims, according to one embodiment.

FIG. 6 depicts an example method 600 for handling claim settlements. Method 600 may include receiving a set of labeled historical claims, each one corresponding to a respective adjusted settlement amount (block 610). As described above, the historical claims, including life and/or health claims, may be labeled according to one or more aspects, including the payout, the type of insurance (e.g., term or whole life, etc.). Method 600 may further include training an ANN using a subset of the labeled historical claims and the each respective adjusted settlement amount (block 620). As described, part of the historical claims may be held back for validating the ANN. Method 600 may include receiving, from a user, a life or health claim (block 630). A life or health claim may include a claim under a life insurance policy and/or health insurance policy. Method 600 may include analyzing the life or health claim using the trained ANN to determine a claim settlement prediction (block 640) and generating, based upon the settlement prediction, a settlement offer (block 650).

Method 600 may also include transmitting the settlement offer to an application in a user device (block 660). For instance, the settlement offer may be texted or transmitted to a user mobile device, such as a smartphone. The user device may be the claimant, a provider (e.g., hospital), a beneficiary, etc. A "user" for purposes of the methods and systems herein may be another computer-implemented process, or a human. In some embodiments, a hybrid claim may be submitted, such as in the case of an accident that included hospitalization and death of a covered person. The method may include additional, less, or alternate actions, including those discussed elsewhere herein.

Machine Learning & Other Matters

The computer-implemented methods discussed herein may include additional, less, or alternate actions, including those discussed elsewhere herein. The methods may be implemented via one or more local or remote processors, transceivers, servers, and/or sensors (such as processors, transceivers, servers, and/or sensors mounted on drones, vehicles or mobile devices, or associated with smart infrastructure or remote servers), and/or via computer-executable instructions stored on non-transitory computer-readable media or medium.

Additionally, the computer systems discussed herein may include additional, less, or alternate functionality, including that discussed elsewhere herein. The computer systems discussed herein may include or be implemented via computer-executable instructions stored on non-transitory computer-readable media or medium.

A processor or a processing element may be trained using supervised or unsupervised machine learning, and the machine learning program may employ a neural network, which may be a convolutional neural network, a deep learning neural network, or a combined learning module or program that learns in two or more fields or areas of interest. Other types of deep, combined, reinforced, or reinforcement learning techniques, programs, models, or modules may also be used.

Machine learning may involve identifying and recognizing patterns in existing data in order to facilitate making predictions for subsequent data. For instance, machine learning may involve identifying and recognizing patterns in existing text or voice/speech data in order to facilitate making predictions for subsequent data. Voice recognition and/or word recognition techniques may also be used. Models may be created based upon example inputs in order to make valid and reliable predictions for novel inputs.

Additionally or alternatively, the machine learning programs may be trained by inputting sample data sets or certain data into the programs, such as image, mobile device, smart or autonomous vehicle, drone, and/or intelligent home, building, and/or real property telematics data. The machine learning programs may utilize deep learning algorithms that may be primarily focused on pattern recognition, and may be trained after processing multiple examples. The machine learning programs may include Bayesian program learning (BPL), voice recognition and synthesis, image or object recognition, optical character recognition, and/or natural language processing—either individually or in combination. The machine learning programs may also include natural language processing, semantic analysis, automatic reasoning, and/or machine learning.

In supervised machine learning, a processing element may be provided with example inputs and their associated outputs, and may seek to discover a general rule that maps inputs to outputs, so that when subsequent novel inputs are provided the processing element may, based upon the discovered rule, accurately predict the correct output. In unsupervised machine learning, the processing element may be required to find its own structure in unlabeled example inputs.

Additional Considerations

With the foregoing, any users (e.g., insurance customers) whose data is being collected and/or utilized may first opt-in to a rewards, insurance discount, or other type of program. After the user provides their affirmative consent, data may be collected from their medical provider and/or the user's device (e.g., mobile device, smart or autonomous vehicle controller, smart home controller, or other smart devices). In return, the user may be entitled insurance cost savings, including insurance discounts for life, health, mobile, renters, personal articles, and/or other types of insurance.

In other embodiments, deployment and use of neural network models at a user device (e.g., the client 202 of FIG. 2) may have the benefit of removing any concerns of privacy or anonymity, by removing the need to send any personal or private data to a remote server (e.g., the server 204 of FIG. 2).

The following additional considerations apply to the foregoing discussion. Throughout this specification, plural instances may implement operations or structures described as a single instance. Although individual operations of one or more methods are illustrated and described as separate operations, one or more of the individual operations may be performed concurrently, and nothing requires that the operations be performed in the order illustrated. These and other variations, modifications, additions, and improvements fall within the scope of the subject matter herein.

The patent claims at the end of this patent application are not intended to be construed under 35 U.S.C. § 112(f) unless traditional means-plus-function language is expressly recited, such as "means for" or "step for" language being explicitly recited in the claim(s). The systems and methods described herein are directed to an improvement to computer functionality, and improve the functioning of conventional computers.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the description. This description, and the claims that follow, should be read to include one or at least one and the singular also includes the plural unless it is obvious that it is meant otherwise.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Additionally, certain embodiments are described herein as including logic or a number of routines, subroutines, applications, or instructions. These may constitute either software (e.g., code embodied on a machine-readable medium) or hardware. In hardware, the routines, etc., are tangible units capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple of such hardware modules exist contemporaneously, communications may be achieved through signal transmission (e.g., over appropriate circuits and buses) that connect the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory product to which it is communicatively coupled. A further hardware module may then, at a later time, access the memory product to retrieve and process the stored output. Hardware modules may also initiate communications with input or output products, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods or routines described herein may be at least partially processor-implemented. For example, at least some of the operations of a method may be performed by one or more processors or processor-implemented hardware modules. The performance of certain of the operations may be distributed among the one or more processors, not only residing within a single machine, but deployed across a number of machines. In some example embodiments, the processor or processors may be located in a single location (e.g., within an office environment or as a server farm), while in other embodiments the processors may be distributed across a number of locations.

The performance of certain of the operations may be distributed among the one or more processors, not only residing within a single machine, but deployed across a number of machines. In some example embodiments, the one or more processors or processor-implemented modules may be located in a single geographic location (e.g., within office environment, or a server farm). In other example embodiments, the one or more processors or processor-implemented modules may be distributed across a number of geographic locations.

Some embodiments may be described using the expression "coupled" and "connected" along with their derivatives. For example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

Upon reading this disclosure, those of skill in the art will appreciate still additional alternative structural and functional designs for the methods and systems disclosed herein through the principles disclosed herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

What is claimed:

1. A computer-implemented method of claims handling, comprising:
receiving a set of labeled historical claims, each labeled historical claim of the set of labeled historical claims corresponding to a respective adjusted settlement amount and a label, the label being one of a plurality of predetermined labels;
training a plurality of first artificial neural networks using a first subset of the set of labeled historical claims;
training a second artificial neural network using a second subset of the set of labeled historical claims and the respective adjusted settlement amount for each labeled historical claim of the second subset of the labeled historical claims, the first subset of the set of labeled historical claims being different from the second subset of the set of labeled historical claims;
receiving, from a user, a life claim, the life claim comprising at least one selected from a group consisting of image data and audio data; and
analyzing the life claim using the plurality of trained first artificial neural networks and the trained second artificial neural network to determine a claim settlement prediction by at least:
extracting text-based content from the at least one selected from a group consisting of image data and audio data in the life claim using at least a natural language processing model;
selecting a trained first artificial neural network from the plurality of trained first artificial neural networks based on the extracted text-based content;
inputting the extracted text-based content to the selected trained first artificial neural network;
determining a claim label representing a category of the life claim using the selected trained first artificial neural network based at least in part on the extracted text-based content, the claim label being one of the plurality of predetermined labels;
inputting the extracted text-based content and the determined claim label to the trained second artificial neural network; and
determining the claim settlement prediction using the trained second artificial neural network based at least in part on the extracted text-based content and the determined claim label.

2. The computer-implemented method of claim 1, wherein the adjusted settlement amount is an inflation-adjusted amount.

3. The computer-implemented method of claim 1, wherein the life claim corresponds to a life insurance policy.

4. The computer-implemented method of claim 3, wherein the life claim includes a photograph of a death certificate of a deceased person under an insurance policy related to the life claim.

5. The computer-implemented method of claim 1, wherein the life claim corresponds to one or both of (i) a worker's compensation insurance policy, and (ii) a disability insurance policy.

6. The computer-implemented method of claim 5, wherein the life claim includes a medical bill under a health insurance policy related to the life claim.

7. The computer-implemented method of claim 1, further comprising:
generating, based upon the claim settlement prediction, a settlement offer;
wherein the settlement offer includes one of (i) a lump sum payment, or (ii) a series of installment payments.

8. The computer-implemented method of claim 7, further comprising:
transmitting the settlement offer to an application in a user device; and
displaying, in the user device, the settlement offer.

9. The computer-implemented method of claim 8, further comprising:
receiving, from the user device, a manifestation of acceptance of the settlement offer.

10. The computer-implemented method of claim 8, wherein displaying, in the user device, the settlement offer comprises displaying a binary choice between (i) a lump sum payment, and (ii) a series of installment payments.

11. The computer-implemented method of claim 8, further comprising:
generating, in association with an account of a beneficiary under an insurance policy associated with the life claim, an automatic payment of money corresponding to the claim settlement prediction.

12. A claims handling user device, comprising:
one or more processors;
one or more memories comprising a claim handling application that, when executed by the one or more processors, causes the one or more processors to:
receive a set of labeled historical claims, each labeled historical claim of the set of labeled historical claims corresponding to a respective adjusted settlement amount and a label, the label being one of a plurality of predetermined labels,
train a plurality of first artificial neural networks using a first subset of the set of labeled historical claims,
train a second artificial neural network using a second subset of the set of labeled historical claims and the respective adjusted settlement amount for each labeled historical claim of the second subset of the labeled historical claims, the first subset of the set of labeled historical claims being different from the second subset of the set of labeled historical claims,
receive a set of life claim information from a user, the set of life claim information comprising at least one selected from a group consisting of image data and audio data,
predict a claim settlement amount by analyzing the set of life claim information using the plurality of trained first artificial neural networks and the trained second artificial network by at least:
extracting text-based content from the at least one selected from a group consisting of image data and audio data in the set of life claim information using at least a natural language processing model,
selecting a trained first artificial neural network from the plurality of trained first artificial neural networks based on the extracted text-based content,
inputting the extracted text-based content to the selected trained first artificial neural network,
determining a claim label representing a category of the set of life claim information using the selected trained first artificial neural network based at least in part on the extracted text-based content, the claim label being one of the plurality of predetermined labels,
inputting the extracted text-based content and the determined claim label to the trained second artificial neural network, and
predicting the claim settlement amount using the trained second artificial neural network based at least in part on the extracted text-based content and the determined claim label,
generate, based upon the claim settlement amount, a settlement offer, display, in a user device, the settlement offer; and
receive, from the user device, a manifestation of acceptance.

13. The claims handling user device of claim 12, wherein the application further causes the one or more processors to:
transmit the set of life claim information to a remote server, and
receive, from the remote server, the claim settlement amount.

14. The claims handling user device of claim 12, wherein the application further causes the one or more processors to:
generate a payment to an account of a beneficiary associated with an insurance policy associated with the life claim.

15. The claims handling user device of claim 12, wherein the set of life claim information is a first set of life claim information, and the application further causes the one or more processors to:
receive a second set of life claim information,
pre-fill a user interface in the user device using the second set of life claim information, and
transmit the first set of life claim information and the second set of life claim information to a remote server.

16. A non-transitory computer readable medium containing computer instructions that, when executed, cause a computer to:
receive a set of labeled historical claims, each labeled historical claim of the set of labeled historical claims corresponding to a respective adjusted settlement amount and a label, the label being one of a plurality of predetermined labels,
train a plurality of first artificial neural networks using a first subset of the set of labeled historical claims,
train a second artificial neural network using a second subset of the set of labeled historical claims and the respective adjusted settlement amount for each labeled historical claim of the second subset of the labeled historical claims, the first subset of the set of labeled historical claims being different from the second subset of the set of labeled historical claims,
receive a set of life claim information from a device of a user, the set of life claim information comprising at least one selected from a group consisting of image data and audio data, predict a claim settlement amount by analyzing the set of life claim information using the plurality of trained first artificial neural networks and the trained second artificial network by at least:
  extracting text-based content from the at least one selected from a group consisting of image data and audio data in the set of life claim information using at least a natural language processing model,
  selecting a trained first artificial neural network from the plurality of trained first artificial neural networks based on the extracted text-based content,
  inputting the extracted text-based content to the selected trained first artificial neural network,
  determining a claim label representing a category of the set of life claim information using the selected trained first artificial neural network based at least in part on the extracted text-based content,
  inputting the extracted text-based content and the determined claim label to the trained second artificial neural network, and
  predicting the claim settlement amount using the trained second artificial neural network based at least in part on the extracted text-based content and the determined claim label,
generate, based upon the claim settlement amount, a settlement offer,
transmit, to the device of the user, the settlement offer, and
receive, from the device of the user, a manifestation of acceptance.

17. The non-transitory computer readable medium of claim 16, comprising further computer instructions that, when executed, cause the computer to:
  transmit the set of life claim information to a remote server, and
  receive, from the remote server, the claim settlement amount.

18. The non-transitory computer-readable medium of claim 16, comprising further computer instructions that, when executed, cause the computer to:
  display, in a display device of the computer, a settlement offer based upon the claim settlement amount and
  receive, from the user, a manifestation of acceptance.

19. The non-transitory computer-readable medium of claim 16, comprising further computer instructions that, when executed, cause the computer to:
  generate a payment to an account of a beneficiary associated with an insurance policy associated with the life claim.

20. The non-transitory computer-readable medium of claim 16, wherein the life claim corresponds to one of (i) life insurance policy, (ii) a worker's compensation insurance policy, or (iii) a disability insurance policy.

* * * * *